(12) United States Patent
Kobayashi

(10) Patent No.: US 11,736,813 B2
(45) Date of Patent: Aug. 22, 2023

(54) IMAGING DEVICE AND EQUIPMENT

(71) Applicant: CANON KABUSHIKI KAISHA, Tokyo (JP)

(72) Inventor: Hideo Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 17/383,847

(22) Filed: Jul. 23, 2021

(65) Prior Publication Data

US 2022/0030164 A1  Jan. 27, 2022

(30) Foreign Application Priority Data

Jul. 27, 2020 (JP) .................... 2020-126454
Apr. 1, 2021 (JP) .................... 2021-062786

(51) Int. Cl.
*H04N 23/80* (2023.01)
*G06T 7/50* (2017.01)

(52) U.S. Cl.
CPC ............. *H04N 23/80* (2023.01); *G06T 7/50* (2017.01)

(58) Field of Classification Search
CPC .... H04N 5/23229; H04N 5/378; H04N 23/80; H04N 25/75; G06T 7/50
See application file for complete search history.

(56) References Cited

U.S. PATENT DOCUMENTS

| 5,379,068 A | * | 1/1995 | Hamasaki | H04N 5/3742 |
| | | | | 348/E3.018 |
| 7,990,440 B2 | | 8/2011 | Kobayashi | |
| 8,665,352 B2 | | 3/2014 | Maeda et al. | |
| 8,710,558 B2 | | 4/2014 | Inoue | |
| 8,835,828 B2 | | 9/2014 | Kobayashi | |
| 8,884,391 B2 | | 11/2014 | Fudaba et al. | |
| 9,264,641 B2 | | 2/2016 | Kobayashi | |
| 9,305,954 B2 | | 4/2016 | Kato | |

(Continued)

FOREIGN PATENT DOCUMENTS

| JP | 2007-142738 A | 6/2007 |
| JP | 2010-246012 A | 10/2010 |

(Continued)

OTHER PUBLICATIONS

U.S. Appl. No. 17/333,305, filed May 28, 2021 by Hideo Kobayashi, et al.

(Continued)

*Primary Examiner* — Michael E Teitelbaum
(74) *Attorney, Agent, or Firm* — Venable LLP

(57) ABSTRACT

An imaging device according to the present disclosure is provided with: a pixel array having a plurality of pixels arranged in a matrix and outputting pixel signals corresponding to the amount of light received; a first column signal line and a second column signal line respectively provided corresponding to the columns of the pixel array; a first column circuit connected to the first column signal line; a second column circuit connected to the second column signal line; a first control line for controlling the first column circuit; a second control line for controlling the second column circuit; and a plurality of switches provided between the first control line and the second control line, and are controlled by a common signal.

36 Claims, 18 Drawing Sheets

(56) References Cited

U.S. PATENT DOCUMENTS

| | | |
|---|---|---|
| 9,357,122 B2 | 5/2016 | Kususaki |
| 9,407,847 B2 | 8/2016 | Maehashi |
| 9,438,828 B2 | 9/2016 | Itano |
| 9,509,931 B2 | 11/2016 | Kobayashi |
| 9,602,752 B2 | 3/2017 | Kobayashi |
| 9,762,839 B2 | 9/2017 | Sakai et al. |
| 10,015,430 B2 | 7/2018 | Kobayashi |
| 10,609,316 B2 | 3/2020 | Kobayashi |
| 2008/0239124 A1* | 10/2008 | Mori .................... H04N 5/3658 348/E3.018 |
| 2012/0175503 A1 | 7/2012 | Kuroda |
| 2013/0140440 A1 | 6/2013 | Kobayashi |
| 2013/0146749 A1* | 6/2013 | Cieslinski ............. H01L 27/148 250/208.1 |
| 2015/0281615 A1 | 10/2015 | Kobayashi |
| 2016/0227141 A1 | 8/2016 | Kobayashi |
| 2020/0378828 A1 | 12/2020 | Kobayashi |
| 2021/0021770 A1 | 1/2021 | Nakazawa |
| 2021/0021777 A1 | 1/2021 | Kobayashi |
| 2021/0021782 A1 | 1/2021 | Sato |

FOREIGN PATENT DOCUMENTS

| | | |
|---|---|---|
| JP | 2016-111376 A | 6/2016 |
| JP | 2017-127038 A | 7/2017 |

OTHER PUBLICATIONS

U.S. Appl. No. 17/241,297, filed Apr. 27, 2021 by Kazuhiro Saito, et al.

U.S. Appl. No. 17/272,040, filed Feb. 26, 2021 by Takehiko Soda, et al.

* cited by examiner

IMAGING DEVICE AND EQUIPMENT

BACKGROUND OF THE INVENTION

Field of the Invention

The present invention relates to an imaging device and an equipment.

Description of the Related Art

An imaging device including a pixel array having a plurality of pixels formed on a semiconductor substrate is used. Japanese Patent Application Laid-Open No. 2016-111376 describes an imaging device including vertical lines (column signal lines) connected to a plurality of pixels in each column, and column circuits including a current load circuit connected to the vertical line.

However, in the imaging device disclosed in Japanese Patent Application Laid-Open No. 2016-111376, when signals from column signal lines are read in various operation modes, image quality degradation may occur.

SUMMARY OF THE INVENTION

According to an aspect of the present disclosure, there is provided an imaging device including a pixel array that includes a plurality of pixels arranged in a matrix and outputs pixel signals in accordance with incident light; a first column signal line and a second column signal line that are respectively provided corresponding to columns of the pixel array; a first column circuit that is connected to the first column signal line; a second column circuit that is connected to the second column signal line; a first control line that controls the first column circuit; a second control line that controls the second column circuit; and a plurality of switches that are provided between the first control line and the second control line, and are controlled by a common signal.

Further features of the present invention will become apparent from the following description of exemplary embodiments with reference to the attached drawings.

DESCRIPTION OF THE EMBODIMENTS

Each embodiment will be described in detail below by using the drawings. In the description of each embodiment, the same components or corresponding components are labeled with same references, and the description thereof may be omitted or simplified.

First Embodiment

Figure 1:
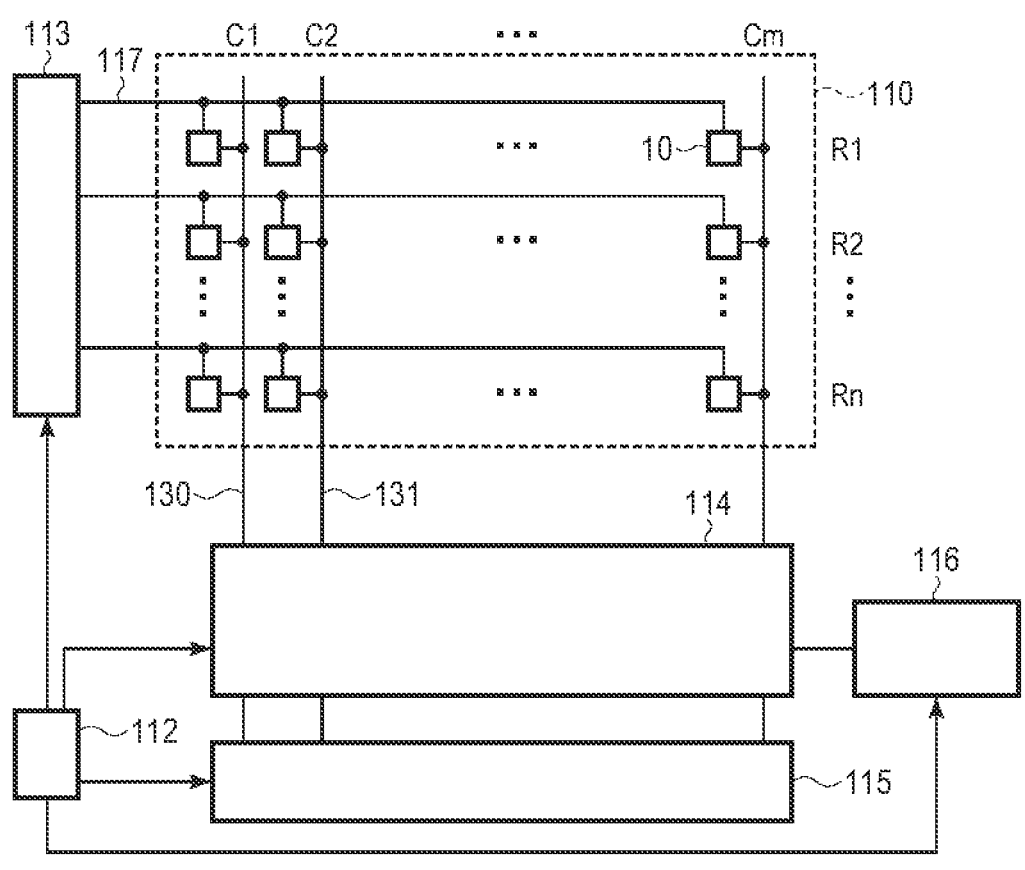
FIG. 1 is a block diagram of an imaging device according to a first embodiment of the present invention.

FIG. 1 is a block diagram of an imaging device according to the present embodiment. The imaging device is constituted on a semiconductor substrate, and is, for example, a CMOS image sensor. A pixel array 110, a vertical scanning circuit 113, a column circuit 114, a horizontal scanning circuit 115, an output circuit 116, and a timing generation circuit 112 are formed on the semiconductor substrate.

The pixel array 110 is provided with a plurality of pixels 10 arranged in a matrix, and each pixel 10 is provided with a photoelectric conversion portion for generating and accumulating signal charges based on incident light. Note that, in the present specification, the row direction indicates the horizontal direction in FIG. 1 (direction D2), and the column direction indicates the vertical direction crossing the row direction D2 in FIG. 1 (direction D1). FIG. 1 shows the pixels 10 including n rows (R1 to Rn) and m columns (C1 to Cm). A micro lens and a color filter may be arranged on the pixel 10. The color filter is, for example, a primary-color filter of red, blue or green, and is provided on each pixel 10 in accordance with the Bayer arrangement.

The pixel array 110 includes an aperture pixel region and a light shielded pixel region in which a light shielding film is formed. The light shielding film is not formed on the pixels 10 included in the aperture pixel region, and a pixel signal corresponding to the incident light can be outputted. The light shielded pixel region is a horizontal optical black (HOB) pixel region arranged adjacent to the row direction D2 with respect to the aperture pixel region. A dark signal corresponding to the noise is obtained from the pixel 10 in the light shielded pixel region.

Further, the pixel array 110 may include ranging rows in which focus detection pixels for outputting pixel signals for focus detection are arranged, and a plurality of imaging rows in which imaging pixels for outputting pixel signals for generating images are arranged. The plurality of pixels 10 connected to the column signal line 130 and the pixels 10 connected to the column signal line 131 are arranged in two columns different from each other. That is, the column signal lines 130 and 131 are connected to the columns of the plurality of pixels 10, and the plurality of pixels 10 in the same column sequentially output pixel signals to the common column signal lines 130 and 131.

The vertical scanning circuit 113 comprises shift registers, gate circuits, buffer circuits, etc., and outputs control signals to the pixels 10 via control lines 117 on the basis of a vertical synchronizing signal, a horizontal synchronizing signal, a clock signal, etc. to drive the pixels 10 for each row.

The column circuit 114 is connected to the column signal lines 130 and 131, amplifies pixel signals in the column signal lines 130 and 131, and performs AD (Analog to Digital) conversion. The column circuit 114 may include current source transistors connected to the column signal lines 130 and 131, comparators for comparing the reference signal with the pixel signals, memories for holding a count signal in accordance with the comparison result by the comparator, and the like, as will be described later.

The horizontal scanning circuit 115 includes a decoder and a shift register, and sequentially reads the count signals held in the memories of the column circuit 114 as digital signals to output to a signal processing unit provided inside or outside the chip (imaging device). The signal processing unit includes a digital signal processor, and performs digital signal processing such as digital gain, digital correlation double sampling, digital offset, and linearity correction.

The output circuit 116 includes a serial output circuit of an LVDS (Low Voltage Differential Signaling) system, and outputs a digital signal subjected to signal processing to the outside of the imaging device at high speed and low power consumption.

The timing generation circuit 112 generates various control signals and drive signals based on the clock and the synchronization signals, and outputs the control signals and drive signals to the vertical scanning circuit 113, the column circuit 114, the horizontal scanning circuit 115, and the output circuit 116 via the control lines. The timing generation circuit 112 may include a reference signal output circuit for generating a reference signal (ramp signal) whose voltage changes in accordance with time, and a counter circuit for generating a count signal that is synchronized with the reference signal. The counter circuit starts counting simultaneously with the change of the voltage of the reference signal and supplies the count signal to the column circuit 114. The column circuit 114 holds the count signal in the memory at the timing when the magnitude relationship between the pixel signal and the reference signal is inverted, and can output the count signal as a digital signal after AD conversion.

Figure 2:
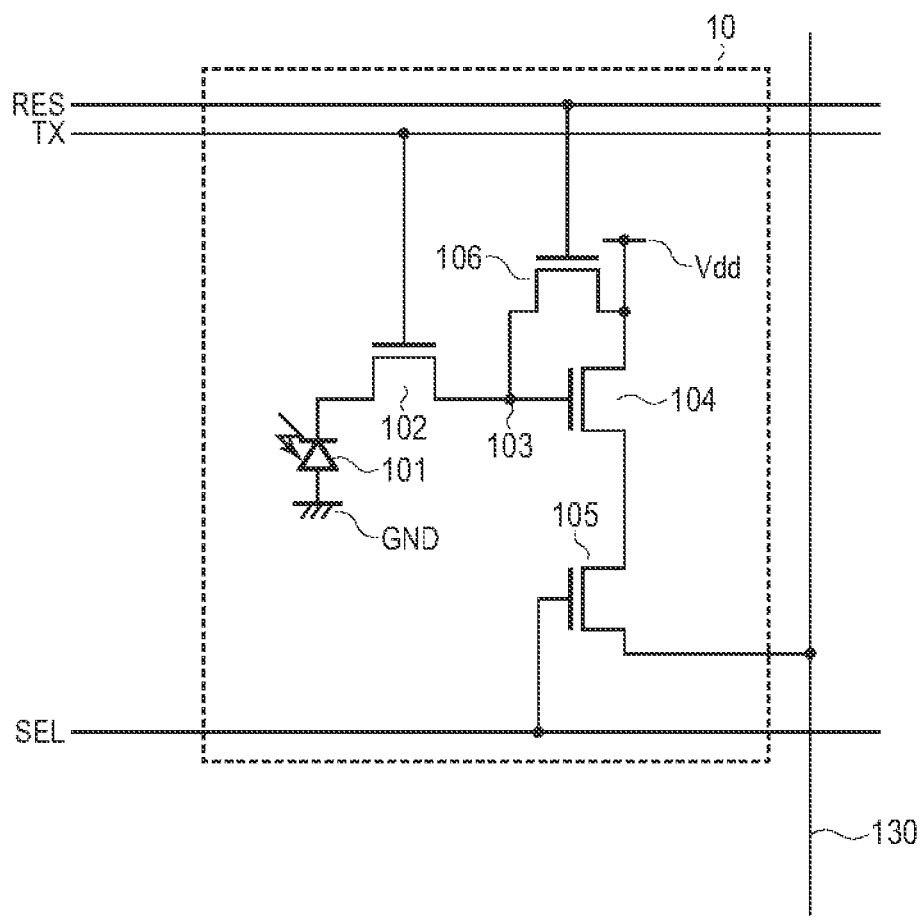
FIG. 2 is an equivalent circuit diagram of a pixel according to the first embodiment of the present invention.

FIG. 2 is an equivalent circuit diagram of the pixel in the present embodiment. The pixel 10 may include a photoelectric conversion portion 101, a transfer transistor 102, a floating diffusion 103, a source follower transistor 104, a selection transistor 105, and a reset transistor 106. In the following description, unless otherwise specified, the transistor is an N-type MOS (Metal Oxide Semiconductor) transistor. A reference voltage (for example, ground voltage GND) is supplied to a back gate node (not illustrated). The reset transistor 106 and the source follower transistor 104 are connected to the power supply voltage Vdd. In place of the N-type MOS transistor, a P-type MOS transistor may be used. In this case, the voltage of the control signal applied to the P-type MOS transistor is inverted with respect to the voltage of the control signal in the N-type MOS transistor.

The photoelectric conversion portion 101 is, for example, a photodiode, and performs photoelectric conversion and charge accumulation caused by incident light. In place of the photodiode, a structure for generating a photoelectric effect, such as a photoelectric conversion film of an organic material or a photogate, may be used. The number of photoelectric conversion portions 101 for each pixel 10 is not limited, and two, four or more photoelectric conversion portions 101 may be provided so as to share one microlens. Further, a buried photodiode can be used to reduce dark current noise. The photoelectric conversion portion 101 is provided with a microlens, and light condensed by the microlens enters the photoelectric conversion portion 101.

The transfer transistor 102 is provided corresponding to the photoelectric conversion portion 101, and a control signal TX is applied to the gate node of the transfer transistor 102. When the control signal TX becomes high level, the charge generated and accumulated in the photoelectric conversion portion 101 due to the incident light is transferred to the floating diffusion 103 via the transfer transistor 102.

The power supply voltage Vdd is applied to the drain node of the source follower transistor 104. The source voltage of the source follower transistor 104 changes according to the variation of the amount of charge transferred to the floating diffusion 103.

The selection transistor 105 is provided between the source follower transistor 104 and the column signal line 130. The selection transistors 105 of the pixels 10 in a plurality of rows are connected to a common column signal line 130. The source follower transistors 104 and the selection transistor 105 operate as a source follower circuit with a constant current source described later. A control signal SEL is applied to the gate node of the selection transistor 105. When the control signal SEL becomes high level, the selection transistor 105 outputs an output corresponding to the source voltage of the source follower transistor 104 to the column signal line 130.

The source node of the reset transistor 106 is connected to the floating diffusion 103, and the power supply voltage Vdd is applied to the drain node. A control signal RES is applied to the gate node of the reset transistor 106. When the control signal RES becomes high level, the reset transistor 106 resets the potential of the floating diffusion 103.

Figure 3:
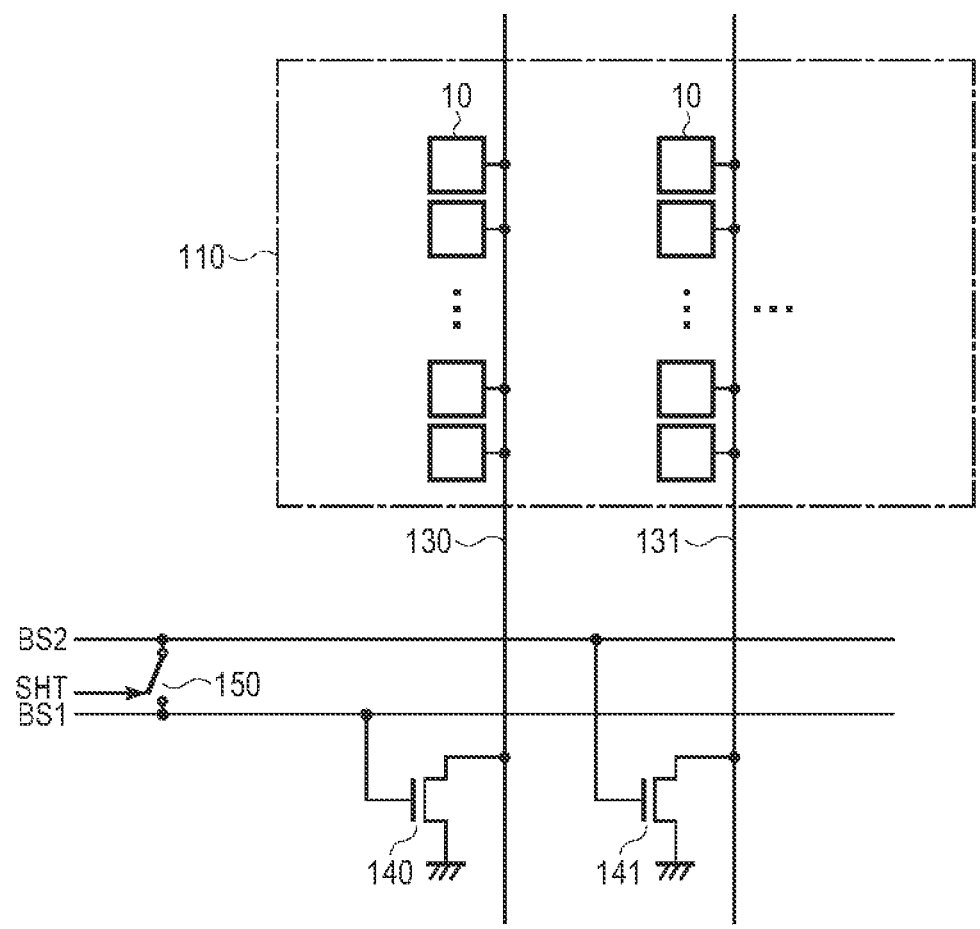
FIG. 3 is a schematic diagram of the imaging device according to the first embodiment of the present invention.

FIG. 3 is a schematic diagram of an imaging device according to the present embodiment, and is a diagram for explaining a switch between a current source transistor and a control line.

The column signal lines 130 and 131 are provided with different current source transistors 140 and 141. The drain node of the first current source transistor 140 is connected to the first column signal line 130, and the source node is connected to the GND node. The gate node of the current source transistor 140 is connected to the first control line BS1. The drain node of the second current source transistor 141 is connected to the second column signal line 131, and the source node is connected to the GND node. The gate node of the current source transistor 141 is connected to the second control line BS2.

In the present embodiment, a switch 150 is provided between the control lines BS1 and BS2. The switch 150 may be a transistor, one main node of the switch 150 is connected to the control line BS1, and the other main node of the switch 150 is connected to the control line BS2. A control signal SHT is applied to a control node (gate node) of the switch 150. When the control signal SHT becomes high level, the switch 150 is turned on, and when the control signal SHT becomes low level, the switch 150 is turned off. By turning the switch 150 on or off, reading in various operation modes can be performed.

When the switch 150 is in an off-state, bias voltages different from each other are supplied to the control lines BS1 and BS2, and the amount of current in the column signal line 130 and the amount of current in the column signal line 131 can be different from each other. For example, thinning reading of the pixel column can be performed by setting the voltage of the control line BS2 to a low level and turning off the current source transistor 141. In this case, although the resolution is reduced, power saving can be realized. Also, the amount of current in reading the signal of the pixel 10 having high sensitivity may be larger than the amount of current in reading the signal of the pixel 10 having low sensitivity.

When the switch 150 is in an on-state, the control lines BS1 and BS2 are conducted, and the voltage difference between the control lines BS1 and BS2 can be reduced. As a result, the difference in the amount of current between the column signal lines 130 and 131 is also reduced, and the difference in the bias voltage between the column signal lines 130 and 131 can be reduced. The reasons are described in detail below.

The charge generated in the photoelectric conversion portion 101 is transferred from the transfer transistor 102 to the floating diffusion 103, and is converted into a signal voltage by a parasitic capacitance associated with the floating diffusion 103. The signal voltage is output to the column signal line 130 via the source follower transistor 104 and the selection transistor 105. The source follower transistor 104 constitutes a source follower circuit together with the current source transistor 140, and the signal of the floating diffusion 103 is current-amplified (buffered) by the source follower transistor 104, and is output as a voltage change to the column signal line 130.

Here, the voltage change of the column signal lines 130 and 131 may cause a variation in the bias voltage of the control lines BS1 and BS2 via the parasitic capacitance of the current source transistors 140 and 141 and the coupling capacitance of the control lines BS1 and BS2. Due to variations in the parasitic capacitances of the current source transistors 140 and 141 and the parasitic capacitances of the control lines BS1 and BS2, the bias voltages of the control lines BS1 and BS2 are different from each other, resulting in a difference in the current values of the current source transistors 140 and 141. Therefore, even when the potentials of the floating diffusions 103 of the pixels 10 of the column signal lines 130 and 131 are equal to each other, a voltage difference occurs between the column signal lines 130 and 131. For example, when an image with uniform illuminance is photographed, a plurality of line-shaped noises occur in the longitudinal direction of the image, and the image quality may be deteriorated.

In the present embodiment, as the switch 150 is provided between the control lines BS1 and BS2 to make the control lines BS1 and BS2 conductive, it is possible to reduce the difference between the bias voltages of the control lines BS1 and BS2 and to suppress the above-described image quality deterioration. Therefore, in a mode in which all pixel columns are read out, the bias voltages of the control lines BS1 and BS2 become a predetermined level, and the switch 150 is driven to an on-state. Thereby, the difference in the bias voltages between the columns can be reduced, and the deterioration of the image quality can be suppressed. On the other hand, in an operation mode in which different readings are performed for each column, the switch 150 is turned off, and the current values of the current source transistors 140 and 141 can be changed for each column. Therefore, according to the present embodiment, it is possible to suppress image quality deterioration while realizing various operation modes.

Second Embodiment

Figure 4:
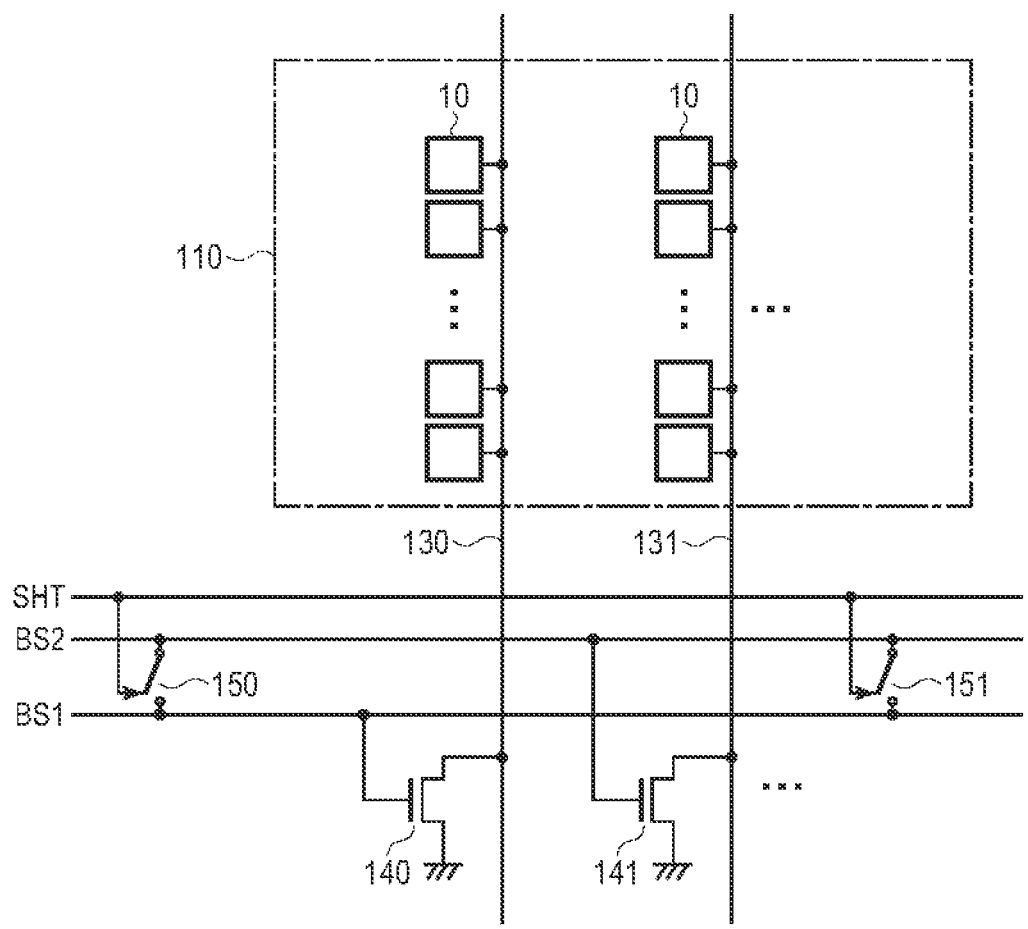
FIG. 4 is a schematic diagram of an imaging device according to a second embodiment of the present invention.

FIG. 4 is a schematic diagram of an imaging device according to the present embodiment. In the first embodiment, one switch 150 is provided between the control lines BS1 and BS2, but a plurality of switches such as switches 150 and 151 may be provided. The switches may be provided for each predetermined number of columns. Although the number of circuit elements increases, it is possible to set the bias voltages to be equal in all positions of the control lines BS1 and BS2. Thus, it is possible to more effectively suppress image quality deterioration.

Third Embodiment

Figure 5:
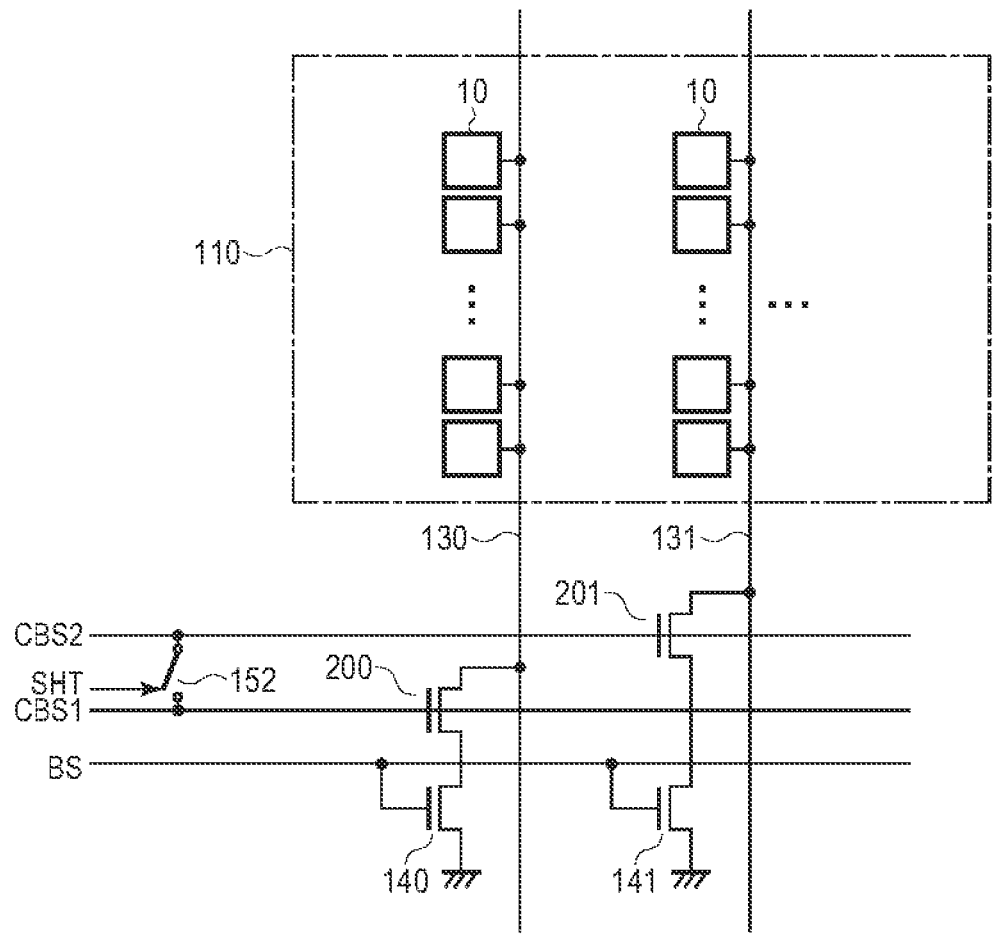
FIG. 5 is a schematic diagram of an imaging device according to a third embodiment of the present invention.

FIG. 5 is a schematic diagram of an imaging device according to the present embodiment. Hereinafter, a configuration different from that of the first embodiment will be described.

The current source transistors 140 and 141 are connected to the column signal lines 130 and 131 via the cascode transistors 200 and 201, respectively. In the column signal line 130, the drain node of the first current source transistor 140 is connected to the source node of the first cascode transistor 200, and the source node of the current source transistor 140 is connected to the GND node. The drain node of the cascode transistor 200 is connected to the column signal line 130. A control line BS is connected to the gate node of the current source transistor 140, and a control line CBS1 is connected to the gate node of the cascode transistor 200. Similarly, in the column signal line 131, the drain node of the second current source transistor 141 is connected to the source node of the second cascode transistor 201, and the source node of the current source transistor 141 is connected to the GND node. The drain node of the cascode transistor 201 is connected to the column signal line 131. The control line BS is connected to the gate node of the current source transistor 140 and the gate node of the current source transistor 141. A control line CBS2 is connected to the gate node of the cascode transistor 201. A switch 152 is provided between the control lines CBS1 and CBS2. A plurality of switches 152 may be provided. One main node of the switch 152 is connected to the control line CBS1, and the other main node is connected to the control line CBS2. A control signal SHT is applied to the control node (gate node) of the switch 152.

When the control signal SHT is at a low level, the switch 152 is turned off, the control lines CBS1 and CBS2 are electrically isolated from each other, and different bias voltages may be applied to the cascode transistors 200 and 201, respectively. Therefore, as in the first embodiment, the amount of current in the column signal line 130 and the amount of current in the column signal line 131 can be different from each other, and various operation modes can be realized. When the control signal SHT is at a high level, the switch 152 is turned on, the control lines CBS1 and CBS2 are conductive, and the bias voltages of the control lines CBS1 and CBS2 are equal to each other. As a result, the amount of current in each of the column signal lines 130 and 131 becomes equal, and the voltage difference between the column signal lines 130 and 131 can be reduced. Therefore, in the present embodiment as well, it is possible to suppress image quality deterioration while realizing various operation modes.

Fourth Embodiment

Figure 6:
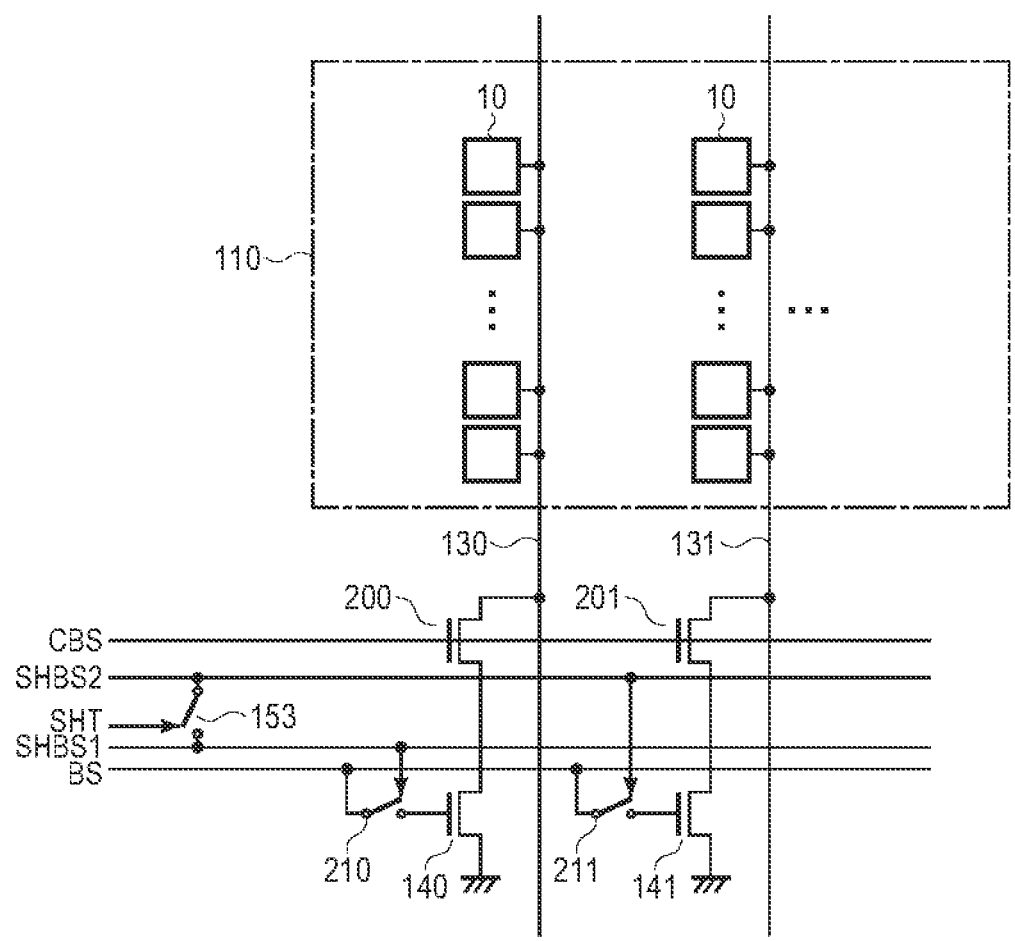
FIG. 6 is a schematic diagram of an imaging device according to a fourth embodiment of the present invention.

FIG. 6 is a schematic diagram of an imaging device according to the present embodiment. Hereinafter, a configuration different from that of the third embodiment will be described.

In the present embodiment, a common control line CBS is connected to the gate nodes of the cascode transistors 200 and 201, and sampling and holding switches 210 and 211 are provided between the gate nodes of the current source transistors 140 and 141 and the control line (bias line) BS, respectively. One main node of the first sampling and holding switch 210 is connected to the gate node of the current source transistor 140, and the other main node is connected to the control line BS. A control node of the sampling and holding switch 210 is connected to a control line SHBS1. One main node of the second sampling and holding switch 211 is connected to the gate node of the current source transistor 141, and the other main node is connected to the control line BS. A control node of the sampling and holding switch 211 is connected to a control line SHBS2. A switch 153 is provided between the control lines SHBS1 and SHBS2, and two main nodes of the switch 153 are connected to the control lines SHBS1 and SHBS2, respectively. A control signal SHT is applied to the control node of the switch 153.

When the control signal SHT is at a low level, the switch 153 is turned off, the control lines SHBS1 and SHBS2 are electrically isolated from each other, and the sampling and holding switches 210 and 211 can be independently driven in an on or off state. When the sampling and holding switches 210 and 211 change from on to off, the bias voltage supplied from the control line BS is held in the capacitance associated with the gate nodes of the current source transistors 140 and 141. This makes it possible to suppress the current fluctuation of the current source transistors 140 and 141 with respect to the voltage fluctuation of the GND. As timing of on or off of the sampling and holding switches 210 and 211 can be controlled independently, various read modes can be realized.

When the control signal SHT is at a high level, the switch 153 is turned on, the control lines SHBS1 and SHBS2 are turned on, and the sampling and holding switches 210 and 211 can be driven at the same timing. Thus, the image quality deterioration caused by the difference in the current values of the current source transistors 140 and 141 can be suppressed. Here, for comparison, it is assumed that the sampling and holding switches 210 and 211 are driven while the switch 153 is turned off. In this case, the inclination of the falling waveform in which the control signal SHT changes from the high level to the low level can be different in the control lines SHBS1 and SHBS2, respectively, due to variations in parasitic capacitance associated with the control lines SHBS1 and SHBS2. Thus, when the sampling and holding switches 210 and 211 are turned off, a difference occurs in the voltage held at the respective gate terminals of the current source transistors 140 and 141. As a result, image quality deterioration may occur due to the difference in the current values of the current source transistors 140 and 141.

According to the present embodiment, in a mode in which on or off timings of the sampling and holding switches 210 and 211 are simultaneously controlled, as the switch 153 is turned on, it is possible to reduce the difference in the current value between the column signal lines and to suppress image quality deterioration. Note that a plurality of switches 153 may be provided.

Fifth Embodiment

Figure 7:
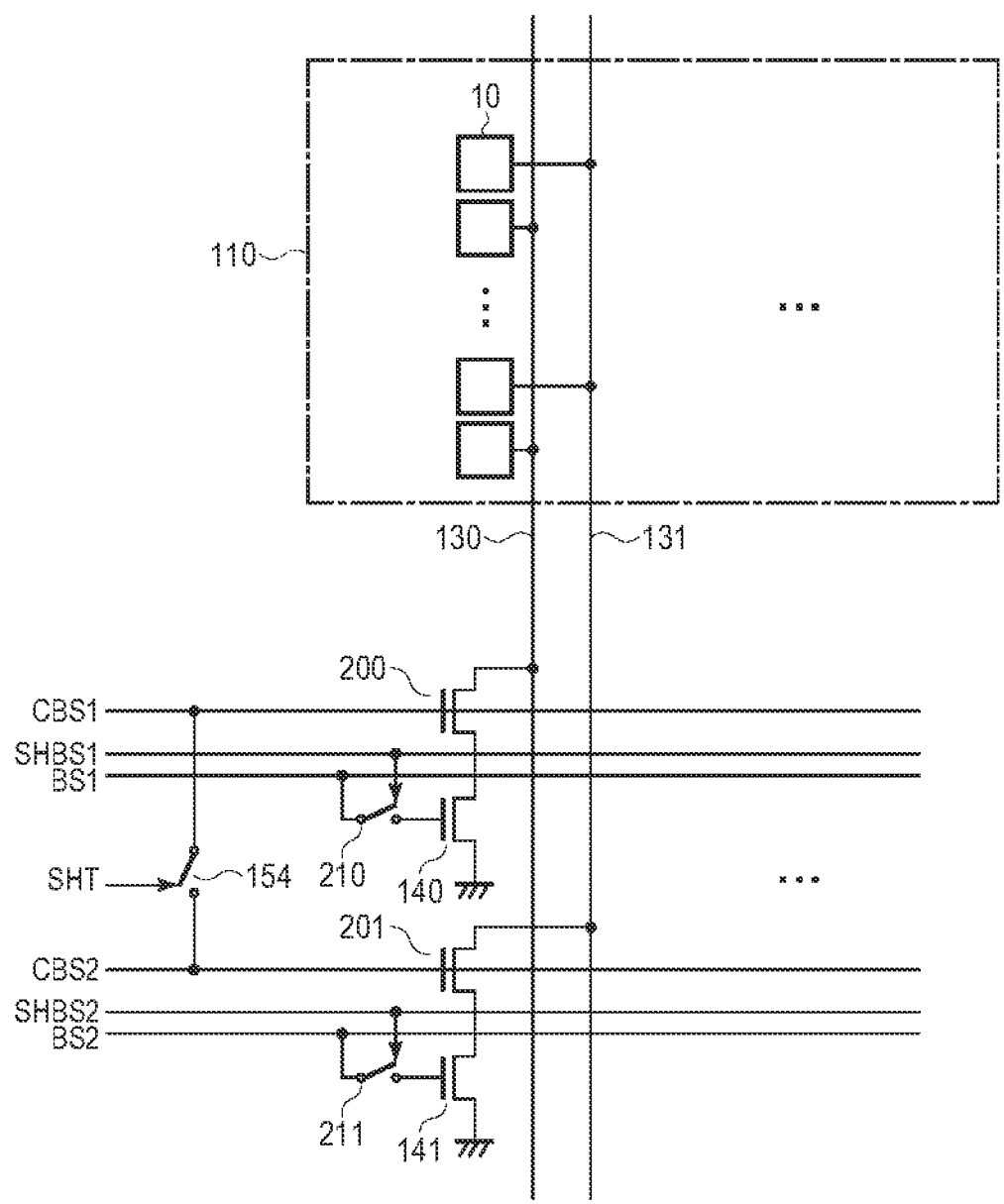
FIG. 7 is a schematic diagram of an imaging device according to a fifth embodiment of the present invention.

FIG. 7 is a schematic diagram of an imaging device according to the present embodiment. Hereinafter, a configuration different from that of the fourth embodiment will be described.

The column signal lines 130 and 131 are connected to the pixels 10 in different rows of the same pixel column (common column) of the pixel array 110. For example, the column signal line 130 may be connected to the pixels 10 in odd rows, and the column signal line 131 may be connected to the pixels 10 in even rows. Thus, the column circuit 114 can simultaneously read the pixels 10 for two rows via the column signal lines 130 and 131, thereby achieving a high-speed read operation. In the present embodiment, the gate nodes of the cascode transistors 200 and 201 are connected to the different control lines CBS1 and CBS2, respectively. A switch 154 is provided between the control lines CBS1 and CBS2. The two main nodes of the switch 154 are connected to the control lines CBS1 and CBS2, respectively, and a control signal SHT is applied to the control node of the switch 154. Note that a plurality of switches 154 may be provided In the present embodiment, it is possible to achieve both an operation mode in which different bias voltages are used for rows and an operation mode in which a common bias voltage is used for rows. The operation mode using different bias voltages between rows may be, for example, an operation mode for reading out the pixels 10 for each row. The operation mode using the common bias voltage between the rows may be a mode in which the pixels 10 of two rows are simultaneously read. In the operation mode in which the common bias voltage is used for a plurality of rows, it is possible to suppress deterioration in image quality caused by a difference in current values between rows.

Figure 8:
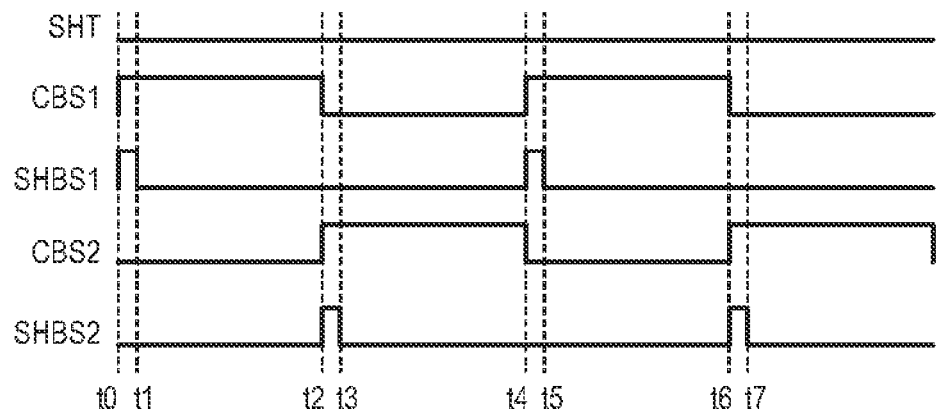
FIG. 8 is a timing chart showing an operation of the imaging device according to the fifth embodiment of the present invention.

FIG. 8 is a timing chart showing the operation of the imaging device according to the present embodiment, and represents the operation mode in which the signals of the pixels 10 are read out by using the column signal lines 130 and 131 alternately.

At the time t0, the control signal SHT is at a low level, and the switch 154 is in an off-state. Accordingly, the control lines CBS1 and CBS2 are electrically isolated from each other, and the bias voltages of the control lines CBS1 and CBS2 can be independently controlled. Since the bias voltage of the control line CBS 1 is at a high level, the cascode transistor 200 is turned on. On the other hand, since the bias voltage of the control line CBS 2 is at a low level, the cascode transistor 201 is turned off.

In a period of the time t0 to t1, the voltage of the control line SHBS1 is at a high level, the sampling and holding switch 210 is turned on, and the bias voltage of the control line BS1 is applied to the gate node of the current source transistor 140. At the time t1, the voltage of the control line SHBS1 changes from a high level to a low level, and the sampling and holding switch 210 is turned off. The gate node of the current source transistor 140 holds the bias voltage of the control line BS1 to set the current of the current source transistor 140. The current flows from the source follower transistor 104 of the pixel 10 to the current source transistor 140.

In a period of the time t1 to t2, the signal of the pixel 10 is read out to the column circuit 114 via the column signal line 130. On the other hand, as the cascode transistor 201 is turned off, the column signal line 131 is in a power saving state. Thus, reading from the pixel 10 via the column signal line 131 is not performed. That is, the signal of the pixel 10 corresponding to one of the odd rows is read out via the column signal line 130.

At the time t2, the voltage of the control line CBS1 changes from a high level to a low level, and the cascode transistor 200 is turned off. As a result, the column signal line 130 is in a power saving state, and reading from the pixel 10 via the column signal line 130 is not performed. On the other hand, the voltage of the control line CBS2 changes from a low level to a high level, and the cascode transistor 201 is turned on.

In a period of the time t2 to t3, the voltage of the control line SHBS2 is at a high level, the sampling and holding switch 211 is turned on, and the bias voltage of the control line BS2 is applied to the gate node of the current source transistor 141. At the time t3, the voltage of the control line SHBS2 changes from the high level to the low level, and the sampling and holding switch 211 is turned off. The gate node of the current source transistor 141 holds the bias voltage supplied from the control line BS2 to set the current of the current source transistor 141. The current flows from the source follower transistor 104 of the pixel 10 to the current source transistor 141.

In a period of the time t3 to t4, the signal of the pixel 10 is read out to the column circuit 114 via the column signal line 131. That is, the signal of the pixel 10 corresponding to one of the even rows is read out via the column signal line 131. On the other hand, since the cascode transistor 200 is turned off, the column signal line 130 is in the power saving state, and reading from the pixel 10 via the column signal line 130 is not performed.

After the time t4, the signals of the pixels 10 of one row among the odd number rows and the even number rows are alternately read out as in the case of the period of the time t0 to t4. In a period of the time t4 to t5, the bias voltage of the control line BS1 is supplied to the gate node of the current source transistor 140 via the sampling and holding switch 210. Even after the sampling and holding switch 210 is turned off at the time t5, the bias voltage of the control line BS1 is held at the gate node of the current source transistor 140. In a period of the time t5 to t6, the signal of the pixel 10 corresponding to one of the odd rows is read out to the column circuit 114 via the column signal line 130. Further, in a period of the time t6 to t7, the bias voltage of the control line BS2 is applied to the gate node of the current source transistor 141 via the sampling and holding switch 211. At the time t7, even after the sampling and holding switch 211 is turned off, the bias voltage of the control line BS2 is held at the gate node of the current source transistor 141. Subsequently, the signal of the pixel 10 corresponding to one of the even rows is read out to the column circuit 114 via the column signal line 131.

As described above, in FIG. 8, it is possible to perform the operation mode in which the signals of the pixels 10 for one row are sequentially read by alternately using the column signal lines 130 and 131. Further, in the present embodiment, as shown in FIG. 9, it is possible to perform the operation mode in which the signals of the pixels 10 of two rows are simultaneously read out by using the column signal lines 130 and 131.

Figure 9:
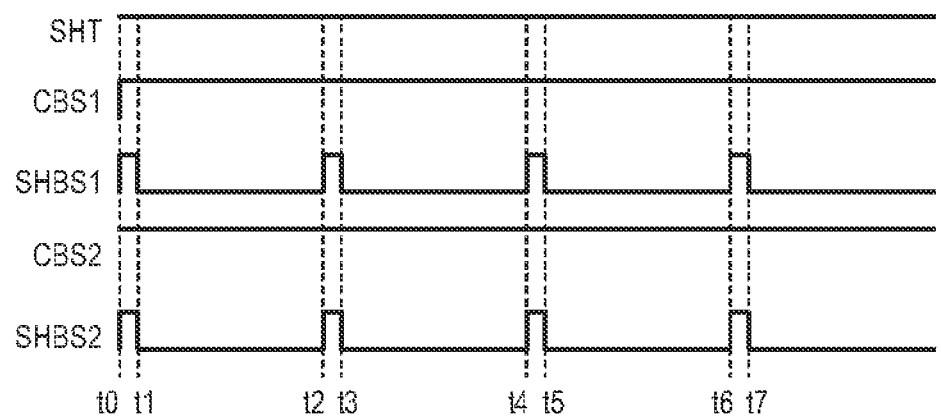
FIG. 9 is a timing chart showing an operation of the imaging device according to the fifth embodiment of the present invention.

FIG. 9 is a timing chart showing the operation of the imaging device according to the present embodiment, and shows an operation mode in which the signals of the pixels 10 of two rows are simultaneously read out. Hereinafter, the timing chart of FIG. 9 will be described focusing on operations different from the timing chart of FIG. 8.

At the time t0, the control signal SHT is at a high level and the switch 154 is in an on-state. The control lines CBS1 and CBS2 become conductive, and the bias voltages of the control lines CBS1 and CBS2 become equal. A predetermined bias voltage is supplied to the control lines CBS1 and CBS2 by a voltage generation circuit. Thus, the voltages of the gate nodes of the cascode transistors 200 and 201 are equal to each other.

In a period of the time t0 to t1, the control lines SHBS1 and SHBS2 become high level, and the sampling and holding switches 210 and 211 are turned on. Thus, the bias voltage of the control line BS1 is supplied to the gate node of the current source transistor 140, and the bias voltage of the control line BS2 is supplied to the gate node of the current source transistor 141. Here, the bias voltages of the control lines BS1 and BS2 can be set equal to each other. At the time t1, the sampling and holding switches 210 and 211 are turned off, and the bias voltage is held at the gate nodes of the current source transistors 140 and 141. In a period of the time t1 to t2, the signals of the two rows of pixels 10 are simultaneously read out via the column signal lines 130 and 131.

Similarly, in periods of the time t2 to t3, t4 to t5, and t6 to t7, the control lines SHBS1 and SHBS2 become high level, and the sampling and holding switches 210 and 211 are turned on, thereby the bias voltage is supplied to the gate nodes of the current source transistors 140 and 141. Further, in periods of the time t3 to t4 and t5 to t6, the signals of the pixels 10 of two rows are simultaneously read out via the column signal lines 130 and 131.

In the operation mode in which the signals of the pixels 10 of two rows are read out, the switch 154 is turned on so that the voltages at the gate nodes of the cascode transistors 200 and 201 are equal to each other. As a result, the difference in the bias voltage between the column signal lines 130 and 131 can be reduced, and noise between rows in simultaneous reading of two rows can be reduced. Therefore, in the present embodiment as well, it is possible to suppress image quality deterioration while realizing various operation modes.

Further, a switch may be provided between the control lines BS1 and BS2, and the switch may be controlled to be in an on-state in the two-rows readout mode. Thus, the difference between the bias voltages of the current source transistors 140 and 141 is further reduced, and the effect of suppressing the image quality deterioration becomes more remarkable.

Sixth Embodiment

Figure 10:
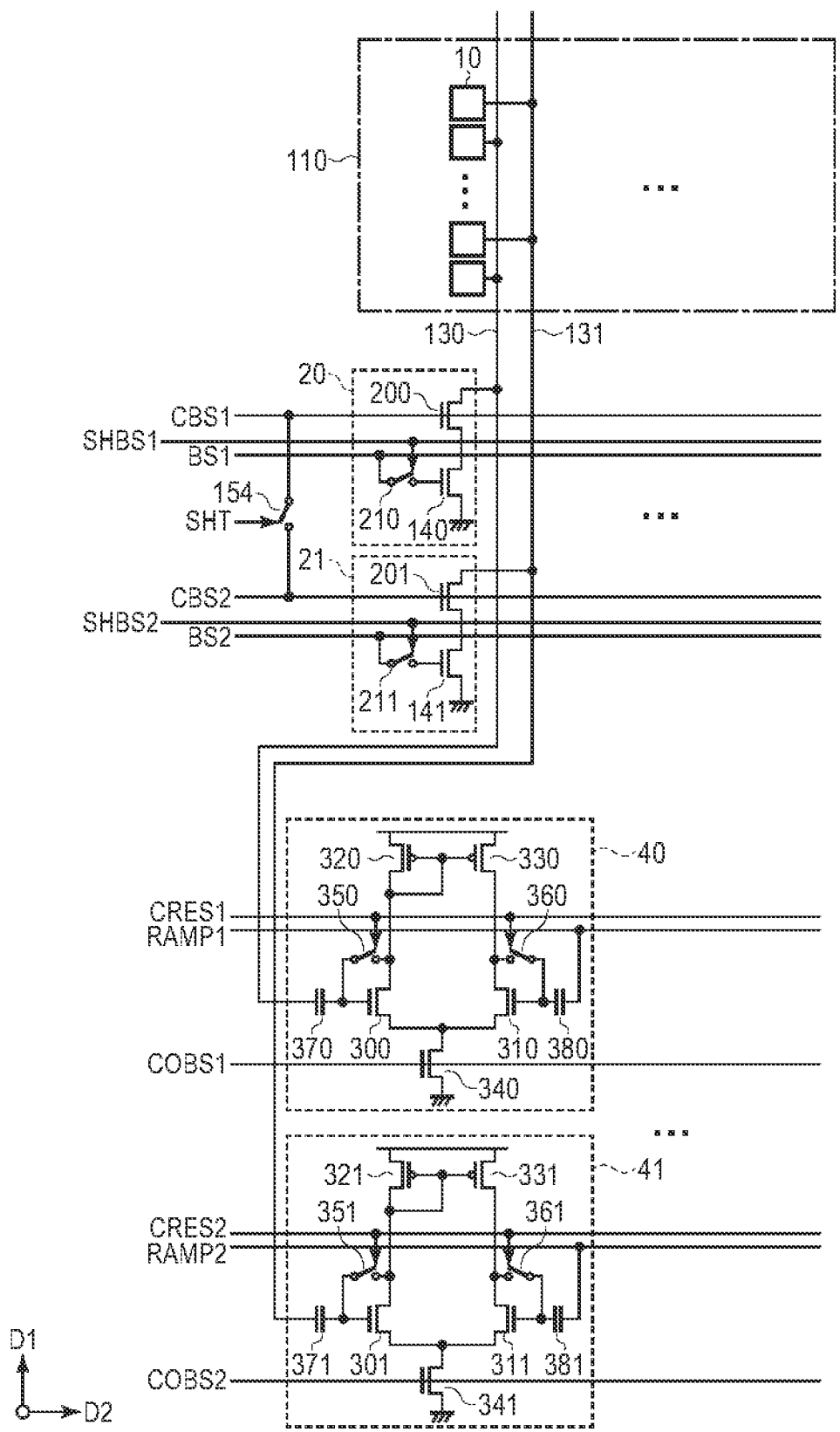
FIG. 10 is a schematic diagram of an imaging device according to a sixth embodiment of the present invention.

FIG. 10 is a schematic diagram of an imaging device according to the present embodiment. Hereinafter, a configuration different from that of the fifth embodiment will be described.

FIG. 10 further shows a first comparator 40 and a second comparator 41. The comparators 40 and 41 constitute the AD converters in the column circuit 114 and are connected to the column signal lines 130 and 131, respectively.

The comparator 40 includes transistors 300, 310, 320 and 330, a first current source transistor 340, first reset switches 350 and 360, and input capacitors 370 and 380. The transistors 300 and 310 constitute a differential pair, and the source nodes of the transistors 300 and 310 are connected to each other. A gate node (input node) of the transistor 300 is connected to the column signal line 130 via an input capacitor 370. A gate node (input node) of the transistor 310 is connected to a control line RAMP1 via the input capacitor 380. A reference signal such as a ramp signal changing with time is supplied from the control line RAMP1. The reset switch 350 is provided between the gate node and the drain node of the transistor 300, and the reset switch 360 is provided between the gate node and the drain node of the transistor 310. The gate nodes of the reset switches 350 and 360 are connected to a control line CRES1. When the voltage of the control line CRES1 becomes high and the reset switches 350 and 360 are turned on, the voltage of the gate nodes of the transistors 300 and 310 is reset.

The source nodes of the transistors 300 and 310 are connected to the source node of the current source transistor 340, and the drain node of the current source transistor 340 is connected to the ground line. The gate node of the current source transistor 340 is connected to a control line COBS1, and the current source transistor 340 is controlled by a first bias voltage supplied via the control line COBS1. The transistors 320 and 330 constitute a current mirror circuit. Each gate node of the transistors 320 and 330 is connected to a source node of the transistor 320. Each drain node of the transistors 320 and 330 is connected to the power supply line. The comparator 40 compares the signal from the column signal line 130 with the reference signal from the control line RAMP1, and outputs a signal corresponding to the comparison result from the drain nodes of the transistors 300 and 310.

The comparator 41 is configured similarly to the comparator 40 and includes transistors 301, 311, 321 and 331, a second current source transistor 341, second reset switches 351 and 361, and input capacitors 371 and 381. A gate node of the transistor 301 is connected to the column signal line 131 via an input capacitor 371. A gate node of the transistor 311 is connected to a control line RAMP2 via the input capacitor 381. A control line CRES2 is connected to the control node of the reset switches 351 and 361. The gate node of the current source transistor 341 is connected to a control line COBS2, and the current source transistor 341 is controlled by a second bias voltage supplied from the control line COBS2. The comparator 41 may output a comparison signal representing a comparison result between a signal from the column signal line 131 and a reference signal from the control line RAMP2 from drain nodes of transistors 301 and 311.

Although not shown, the imaging device may further include a reference signal circuit for generating the reference signal, a counter circuit for counting up or down a counter of the count signal in synchronization with the reference signal, and a digital memory capable of holding digital signals of a plurality of bits. The counter circuit starts counting the clock pulse signal simultaneously with the start of the voltage change of the reference signal and outputs the count signal. The comparison signals output from the comparators 40 and 41 are input to the digital memory. The digital memory is capable of holding digital signals of a plurality of bits, and holds a count signal at a timing when the comparison signal is inverted. The count signal held in the digital memory represents a digital signal obtained by AD converting signals from the column signal lines 130 and 131.

FIG. 10 schematically shows a circuit arrangement on a semiconductor substrate. On the semiconductor substrate, the current load circuits 20 and 21 are arranged close (adjacent) to each other, and the comparators 40 and 41 are also arranged close (adjacent) to each other. That is, a plurality of circuits of the same kind are gathered and arranged collectively. Thereby, an effect of a short circuit of the switch 154 can be enhanced and the crosstalk between the circuits can be reduced. Here, as a comparison, it is assumed that the current load circuit 20, the comparator 40, the current load circuit 21, and the comparator 41 are arranged in this order. In this case, the distance between the control lines CBS1 and CBS2 becomes longer, and even if the switch 154 is turned on, the effect of the short-circuit of the control lines CBS1 and CBS2 is reduced. That is, an impedance between the control lines CBS1 and CBS2 becomes larger, and the effect of reducing the difference in the bias voltage may not be sufficient.

In contrast, according to the present embodiment, as the comparators 40 and 41 are disposed close to each other, the distance between the control lines CBS1 and CBS2 is shorter, and the effect of reducing the difference in the bias voltages of the control lines CBS1 and CBS2 when the switch 154 is turned on can be enhanced. Further, in the comparative example, since the comparator 40 is disposed between the current load circuits 20 and 21, the wiring for short-circuiting the control lines CBS1 and CBS2 crosses the comparator 40. Accordingly, the wiring receives crosstalk from the control lines RAMP1 and RAMP2, for example. On the other hand, according to the present embodiment, since the current load circuits 20 and 21 are arranged together, the distance between the control lines CBS1 and CBS2 short-circuited by the switch 154 can be short as compared with the comparative example. Since the length of the wiring to be short-circuited becomes short, the effect of short-circuiting can be enhanced. Further, according to the present embodiment, since the short-circuited wires do not pass through the comparators 40 and 41, it is possible to avoid crosstalk from the control lines RAMP1 and RAMP2, for example. Further, according to the present embodiment, the current load circuit 20, the current load circuit 21, the comparator 40, and the comparator 41 are arranged in order along the column direction D1. Therefore, the column circuit 114 can be arranged in a narrow region corresponding to one pixel column.

Also in the present embodiment, it is possible to suppress image quality deterioration while realizing various operation modes.

Seventh Embodiment

Figure 11:
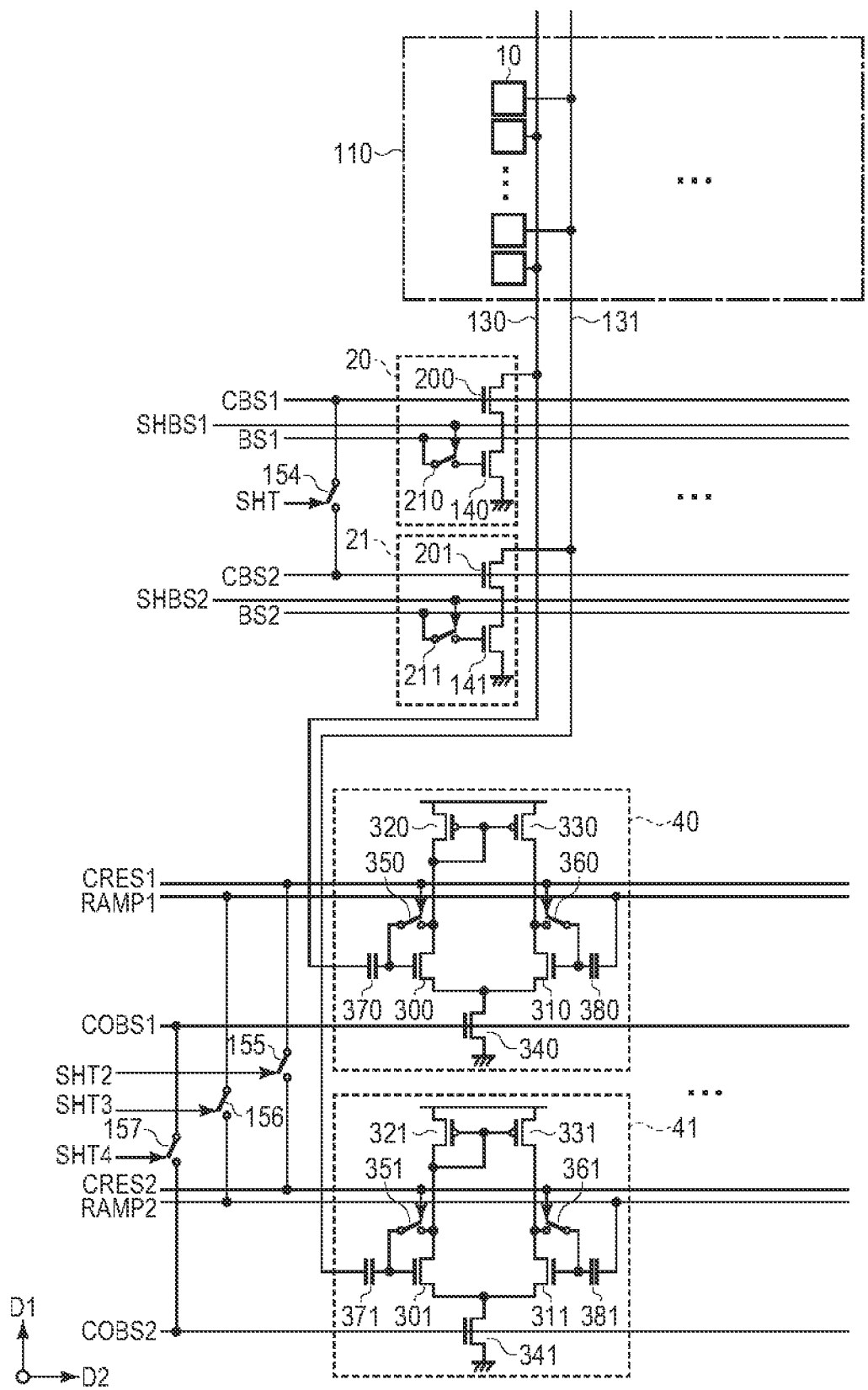
FIG. 11 is a schematic diagram of an imaging device according to a seventh embodiment of the present invention.

FIG. 11 is a schematic diagram of an imaging device according to the present embodiment. In the present embodiment, switches are further provided between the control lines of the comparators 40 and 41. Hereinafter, a configuration different from that of the sixth embodiment will be described.

In FIG. 11, a switch 155 is provided between the control lines CRES1 and CRES2, and a control line SHT2 is connected to the control node of the switch 155. A switch 156 is provided between the control lines RAMP1 and RAMP2, and a control line SHT3 is connected to a control node of the switch 156. Further, a switch 157 is provided between the control lines COBS1 and COBS2, and a control line SHT4 is connected to the control node of the switch 157. Note that a plurality of switches 155, a plurality of switches 156 and a plurality of switches 157 may be provided.

In an operation mode for reading signals of the pixels 10 for two rows from the column signal lines 130 and 131, the switches 155, 156 and 157 in the comparators 40 and 41 are controlled to be an on-state in addition to the switches 154 of the current load circuits 20 and 21. When the switch 155 is turned on, the control lines CRES1 and CRES2 become conductive. Thus, it is possible to ensure equality in the voltage of the control signal applied to the respective control nodes of the reset switch 350 of the comparator 40 and the reset switch 351 of the comparator 41 and timing of the transition to the high level and the low level. When the switch 156 is turned on, the control lines RAMP1 and RAMP2 are conducted. Thus, it is possible to ensure equality in the voltage and the timing of the change of the reference signals input to the comparators 40 and 41. Further, when the switch 157 is turned on, the control lines COBS1 and COBS2 are conducted. As a result, the bias voltages of the current source transistor 340 of the comparator 40 and the current source transistor 341 of the comparator 41 become equal to each other. Therefore, in the present embodiment as well, it is possible to suppress image quality deterioration while realizing various operation modes.

Eighth Embodiment

Figure 12:
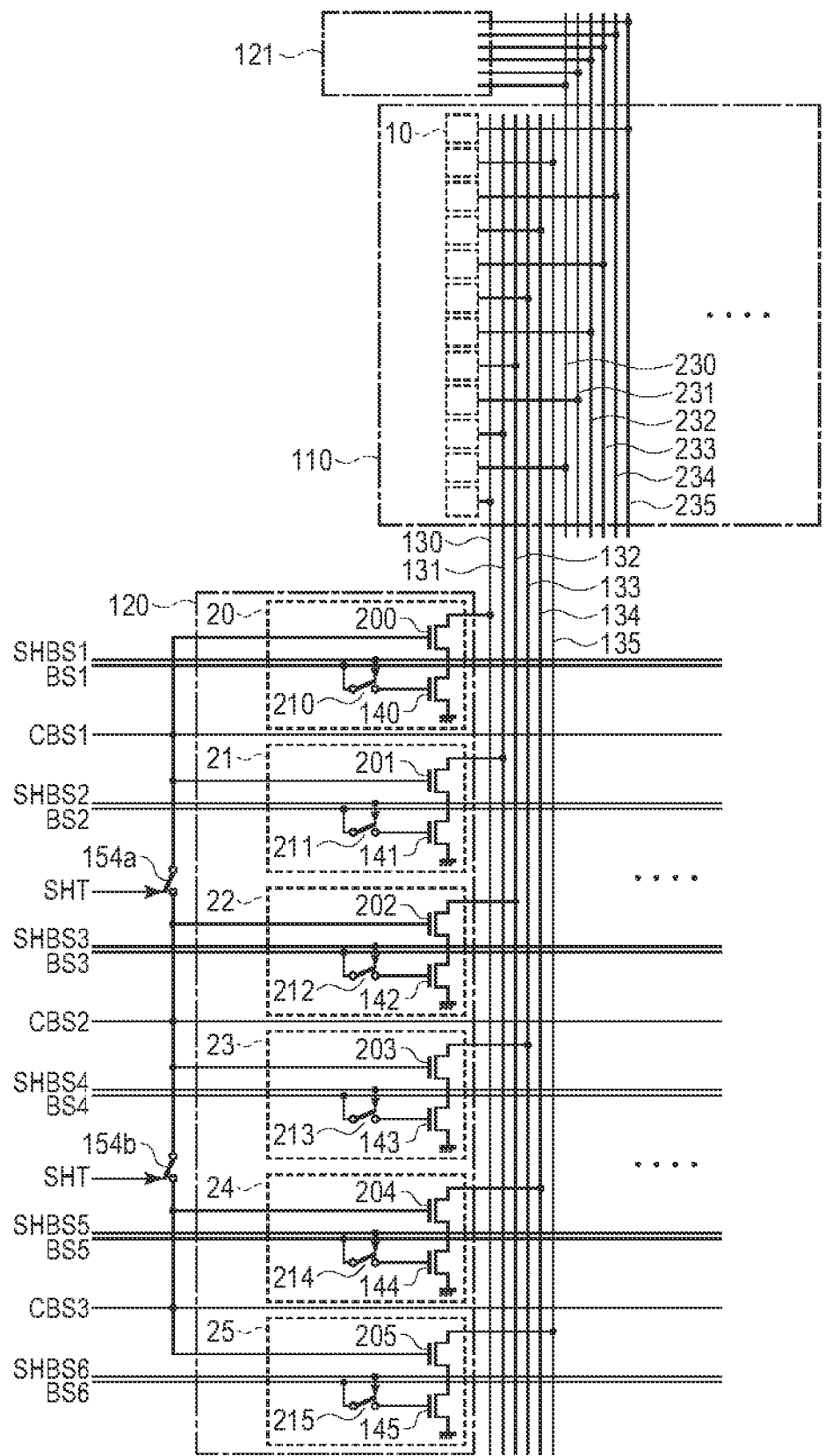
FIG. 12 is a schematic diagram of an imaging device according to an eighth embodiment of the present invention.

FIG. 12 is a schematic diagram of an imaging device according to the present embodiment. Hereinafter, a configuration different from that of the seventh embodiment will be described.

In the present embodiment, twelve column signal lines 130 to 135 and 230 to 235 are arranged in one pixel column, and the pixels 10 in the twelve different rows of the same pixel column are connected to the twelve column signal lines 130 to 135 and 230 to 235, respectively. For example, the even row pixels 10 may be connected to the column signal lines 130 to 135 and the odd row pixels 10 may be connected to the column signal lines 230 to 235. The column signal lines 130 to 135 are connected to a load circuit group 120, and the column signal lines 230 to 235 are connected to a load circuit group 121. Although the twelve rows of pixels 10 are shown in FIG. 12, the other rows of pixels 10 may also be connected to the load circuit groups 120 and 121. Moreover, the column signal lines 130 to 135 and 230 to 235 are not necessarily arranged in the same pixel rows, and some or all of the column signal lines 130 to 135 and 230 to 235 may be arranged in the different pixel rows.

The load circuit groups 120 and 121 may be arranged symmetrically with respect to the pixel array 110. For example, the load circuit group 120 may be provided at an upper position of the pixel array 110, and the load circuit group 121 may be provided at a lower position of the pixel array 110. Since the load circuit group 120 and the load circuit group 121 have the same configuration, the configuration of the load circuit group 120 will be described below.

The load circuit group 120 includes current load circuits 20 to 25, and the current load circuits 20 to 25 are connected to the column signal lines 130 to 135, respectively. The first current load circuit 20 (first column circuit) is connected to the first column signal line 130, and the third current load circuit 21 (third column circuit) is connected to the third column signal line 131. The second current load circuit 22 (second column circuit) is connected to the second column signal line 132, and the fourth current load circuit 23 (fourth column circuit) is connected to the fourth column signal line 133. Similarly, the current load circuit 24 is connected to the column signal line 134, and the current load circuit 25 is connected to the column signal line 135. The current load circuits 20 to 25 include cascode transistors 200 to 205, current source transistors 140 to 140, and sampling and holding switches 210 to 215, respectively.

The sampling and holding switches 210 to 215 are provided between the gate nodes of the current source transistors 140 to 145 and the control lines (bias lines) BS1 to BS6, respectively. The control nodes of the sampling and holding switches 210 to 215 are connected to control lines SHBS1 to SHBS6, respectively.

The control line CBS1 (first control line and third control line) is connected to the gate nodes of the cascode transistors 200 and 201, the control line CBS2 (second control line and fourth control line) is connected to the gate nodes of the cascode transistors 202 and 203, and the control line CBS3 is connected to the gate nodes of the cascode transistors 204 and 205. According to the configuration, a common bias voltage is applied to the current load circuits 20 and 21 from the control line CBS1, and a common bias voltage is applied to the current load circuits 22 and 23 from the control line CBS2. A common bias voltage is applied from the control line CBS3 to the current load circuits 24 and 25.

A switch 154a is provided between the control lines CBS1 and CBS2, and a switch 154b is provided between the control lines CBS2 and CBS3. Note that a plurality of switches 154a and a plurality of switches 154b may be provided. One main node of the switch 154a is connected to the control line CBS1, and the other main node is connected to the control line CBS2. One main node of the switch 154b is connected to the control line CBS2, and the other main node is connected to the control line CBS3. A control signal SHT is applied to the control node of the switches 154a and 154b. When the switch 154a is turned on, the control lines CBS 1 and CBS2 are conducted, and a common bias voltage is applied to the current load circuits 20 to 23. When the switch 154b is turned on, the control lines CBS2 and CBS3 are conducted, and a common bias voltage is applied to the current load circuits 22 to 25. When the switches 154a and 154b are both in the on-state, the control lines CBS1, CBS2, and CBS3 are conducted, and a common bias voltage is applied to the current load circuits 20 to 25.

In the present embodiment, it is possible to simultaneously read out the pixels 10 of the twelve rows, thereby realizing a high-speed read operation. Further, it is possible to suppress difference between rows in the mode in which the pixels 10 are read out by every twelve rows while realizing the mode in which the pixels 10 are read out by every four rows.

Figure 13:
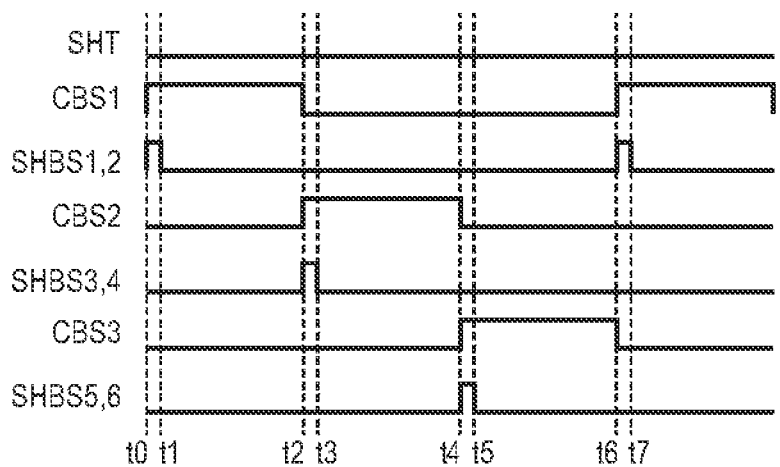
FIG. 13 is a timing chart showing an operation of the imaging device according to the eighth embodiment of the present invention.

FIG. 13 is a timing chart showing the operation of the imaging device according to the present embodiment, and shows an operation mode in which the signals of the pixels 10 of every four rows are read out among the column signal lines 130 to 135 and 230 to 235.

At the time t0, the control signal SHT is at a low level, and the switches 154a and 154b are in an off-state. Accordingly, the control lines CBS1, CBS2, and CBS3 are electrically isolated from each other, and the bias voltages of the control lines CBS1, CBS2, and CBS3 can be independently controlled. Here, as the bias voltage of the control line CBS1 is at a high level, the cascode transistors 200 and 201 are turned on. On the other hand, as the bias voltages of the control lines CBS2 and CBS3 are at a low level, the cascode transistors 202 to 205 are in an off-state.

In a period of the times t0 to t1, the voltage of the control lines SHBS1 and SHBS2 are at a high level, the sampling and holding switches 210 and 211 are turned on, and the bias voltages of the control lines BS1 and BS2 are applied to the gate nodes of the current source transistors 140 and 141, respectively. At the time t1, the voltages of the control lines SHBS1 and SHBS2 change from a high level to a low level, and the sampling and holding switches 210 and 211 are turned off. The gate nodes of the current source transistors 140 and 141 hold the bias voltages of the control lines BS1 and BS2, respectively, and the currents of the current source transistors 140 and 141 are set. The current flows from the source follower transistor 104 of the pixel 10 to the current source transistors 140 and 141 via the column signal lines 130 and 131, respectively.

In a period of the time t1 to t2, the signals of the pixels 10 are read to the column circuit 114 via the column signal lines 130 and 131. On the other hand, the cascode transistors 202 to 205 are turned off, and the column signal lines 132 to 135 are in a power saving state. Accordingly, reading from the pixels 10 via the column signal lines 132 to 135 is not performed. That is, the signals of the pixels 10 of two rows among the even rows are read out via the column signal lines 130 and 131. Similarly, the signals of the pixels 10 of two rows among the odd rows are read out via the column signal lines 230 and 231. Thus, the signals of the pixels 10 of four rows among twelve rows are read out.

At the time t2, the voltage of the control line CBS1 changes from a high level to a low level, and the cascode transistors 200 and 201 are turned off. As a result, the column signal lines 130 and 131 are in the power saving state, and reading from the pixel 10 via the column signal lines 130 and 131 is not performed. On the other hand, the voltage of the control line CBS2 changes from a low level to a high level, and the cascode transistors 202 and 203 are turned on.

In a period of the time t2 to t3, the voltages of the control lines SHBS3 and SHBS4 are at a high level, the sampling and holding switches 212 and 213 are turned on, and the bias voltages of the control lines BS3 and BS4 are applied to the gate nodes of the current source transistors 142 and 143, respectively. At the time t3, the voltages of the control lines SHBS3 and SHBS4 change from the high level to the low level, and the sampling and holding switches 212 and 213 are turned off. The gate nodes of the current source transistors 142 and 143 hold the bias voltages supplied from the control lines BS3 and BS4, respectively, and the currents of the current source transistors 142 and 143 are set. The current flows from the source follower transistor 104 of the pixel 10 to the current source transistors 142 and 143.

In a period of the time t3 to t4, the signals of the pixels 10 are read to the column circuit 114 via the column signal lines 132 and 133. That is, the signals of the pixels 10 of two rows among the odd rows are read out via the column signal lines 132 and 133. The cascode transistors 200, 201, 204, and 205 are turned off. Accordingly, the column signal lines 130, 131, 134, and 135 are in the power saving state, and reading from the pixels 10 through the column signal lines 130, 131, 134, and 135 is not performed. Similarly, the signals of the pixels 10 of two rows among the odd rows are read out via the column signal lines 232 and 233. Thus, the signals of the pixels 10 of four rows among twelve rows are read out.

In a period of the time t4 to t5, the voltages of the control lines SHBS5 and SHBS6 are high level, the sampling and holding switches 214 and 215 are turned on, and the bias voltages of the control lines BS5 and BS6 are applied to the gate nodes of the current source transistors 144 and 145, respectively. At the time t5, the voltages of the control lines SHBS5 and SHBS6 change from the high level to the low level, and the sampling and holding switches 214 and 215 are turned off. The gate nodes of the current source transistors 144 and 145 hold the bias voltages supplied from the control lines BS5 and BS6, respectively, and the currents of the current source transistors 144 and 145 are set.

In a period of the time t5 to t6, the signals of the pixels 10 are read to the column circuit 114 via the column signal lines 134 and 135. On the other hand, the cascode transistors 200 to 203 are turned off, and the column signal lines 130 to 133 are in the power saving state, and reading from the pixels 10 via the column signal lines 130 to 133 is not performed. Similarly, the signals of the pixels 10 of two rows among the odd rows are read out via the column signal lines 234 and 235. Thus, the signals of the pixels 10 of four rows among twelve rows are read out. After the time t6, similarly to the time t0 to t6, the signals of the pixels 10 of four rows among the column signal lines 130 to 135 and 230 to 235 of twelve rows are sequentially read out.

Further, in the present embodiment, it is also possible to simultaneously read twelve rows of pixels 10 of the column signal lines 130 to 135 and 230 to 235 as shown below.

Figure 14:
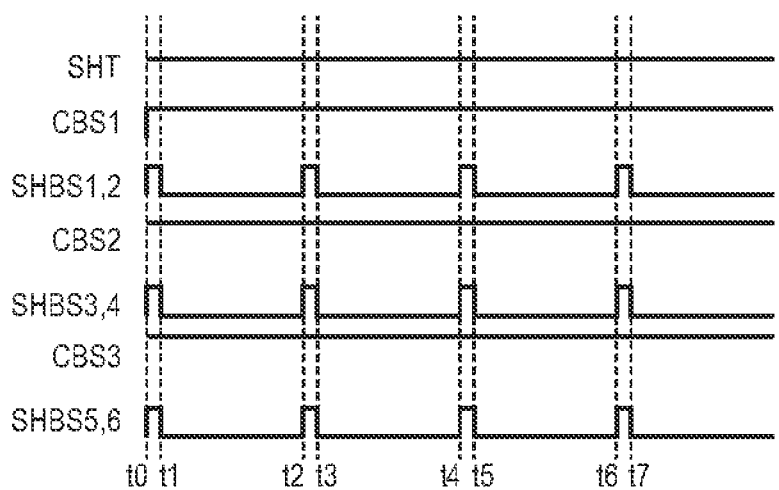
FIG. 14 is a timing chart showing the operation of the imaging device according to the eighth embodiment of the present invention.

FIG. 14 is a timing chart showing the operation of the imaging device according to the present embodiment, and shows an operation mode in which the signals of the pixels 10 of twelve rows of the column signal lines 130 to 135 and 230 to 235 are simultaneously read out. Hereinafter, the timing chart of FIG. 14 will be described with respect to operations different from the timing chart of FIG. 13.

At the time t0, the control signal SHT is at a high level, and the switches 154a and 154b are turned on. The control lines CBS1, CBS2, and CBS3 become conductive, and the bias voltages of the control lines CBS1, CBS2, and CBS3 become equal. A predetermined bias voltage is supplied to the control lines CBS1, CBS2 and CBS3 by a voltage generation circuit. Therefore, the voltages of the respective gate nodes of the cascode transistors 200 to 205 are equal to each other.

In a period of the time t0 to t1, the control lines SHBS1, SHBS2, and SHBS3 are at a high level, and the sampling and holding switches 210 to 215 are turned on. Thus, the gate nodes of the current source transistors 140 to 145 are supplied with the bias voltages of the control lines BS1 to BS6, respectively. Here, the bias voltages of the control lines BS1 to BS6 can be set equal to each other. At the time t1, the sampling and holding switches 210 to 215 are turned off, and bias voltages are held at the gate nodes of the current source transistor 140 to 145, respectively. In a period of the time t1 to t2, signals of six rows of pixels 10 are read out via the column signal lines 130 to 135. Similarly, in the column signal lines 230 to 235, the signals of the pixels 10 of six rows are read out. That is, the signals of twelve rows of pixels 10 are simultaneously read out via the column signal lines 130 to 135 and 230 to 235.

Similarly, in the periods of the time t2 to t3, t4 to t5, and t6 to t7, the control lines SHBS1, SHBS2, and SHBS3 are at a high level, and the sampling and holding switches 210 to 215 are turned on, thereby the bias voltages are supplied to the gate node of the current source transistors 140 to 145. Further, in the periods of the time t3 to t4 and t5 to t6, signals of twelve rows of pixels 10 are simultaneously read out via the column signal lines 130 to 135 and 230 to 235.

In an operation mode in which signals of twelve rows of pixels 10 are read out, the switches 154a and 154b are turned on, so that the voltages at the respective gate nodes of the cascode transistors 200 to 205 are equal to each other. As a result, the difference in the bias voltages between the column signal lines 130 to 135 can be reduced, and noise between rows in simultaneous reading of twelve rows can be reduced. Therefore, in the present embodiment as well, it is possible to suppress image quality deterioration while realizing various operation modes.

Ninth Embodiment

Figure 15:
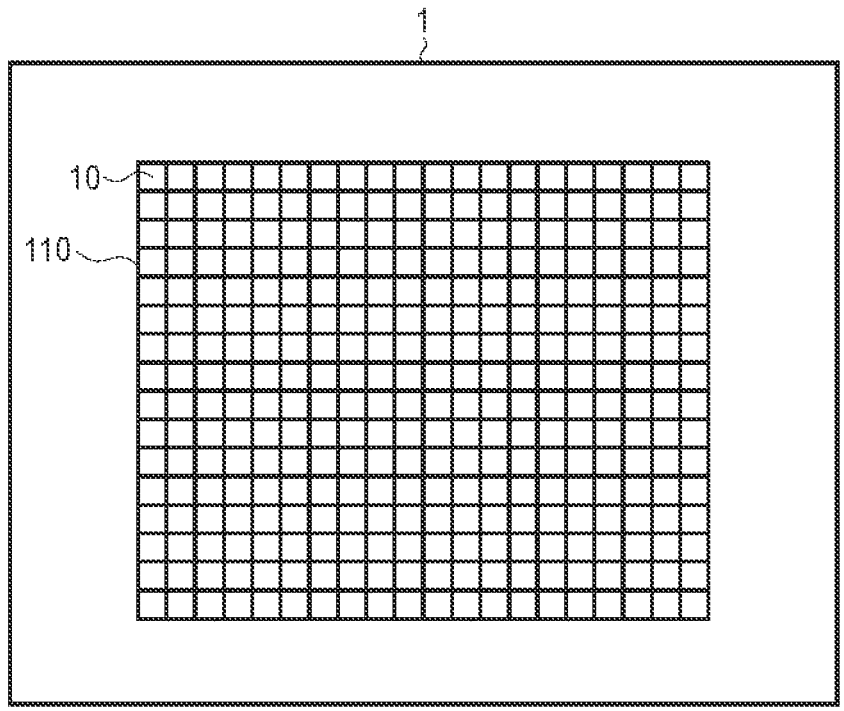
FIG. 15 is a schematic diagram of an imaging device according to a ninth embodiment of the present invention.
Figure 16:
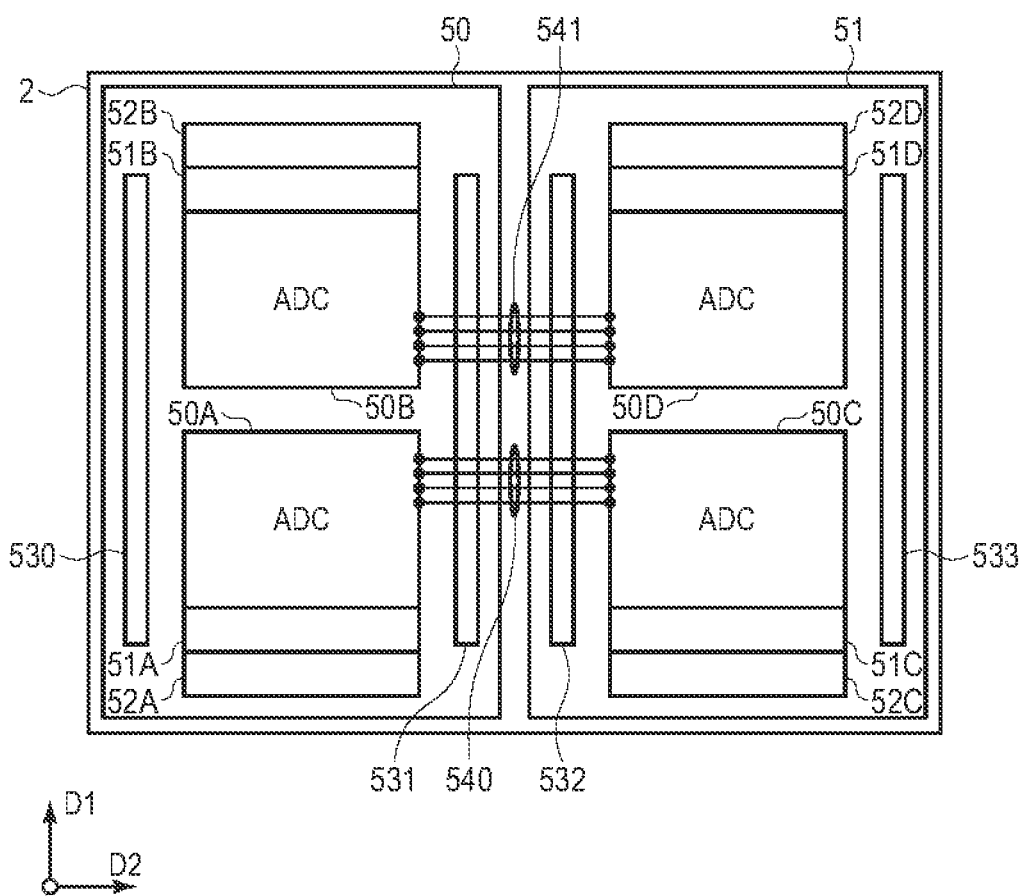
FIG. 16 is a schematic diagram of the imaging device according to the ninth embodiment of the present invention.

FIGS. 15 and 16 are schematic diagrams of the imaging device according to the present embodiment, and are related to a modification example of the imaging device according to the eighth embodiment. Hereinafter, a configuration different from that of the eighth embodiment will be described.

The imaging device according to the present embodiment is of a so-called back surface irradiation type and includes a pixel substrate 1 and a circuit substrate 2 that are to be stacked with each other. The pixel array 110 including a plurality of pixels 10 arranged in a matrix is formed on the pixel substrate 1. Further, control lines for driving the pixels 10 and signal lines for reading signals from the pixels 10 are arranged on the pixel substrate 1.

The circuit substrate 2 is stacked on the pixel substrate 1. On the circuit substrate 2, two signal processing circuits 50 and 51 are formed side by side in the row direction D2. The signal processing circuit 50 includes AD conversion circuits (ADC) 50A and 50B, logic circuits 51A and 51B, output circuits 52A and 52B, and row selection circuits (vertical scanning circuit) 530 and 531. Similarly, the signal processing circuit 51 includes AD conversion circuits 50C and 50D, logic circuits 51C and 51D, output circuits 52C and 52D, and row selection circuits 532 and 533. The AD conversion circuits 50A and 50C may be arranged corresponding to the column signal lines 130 to 135 of the even rows in FIG. 12, and the AD conversion circuits 50B and 50D may be arranged corresponding to the column signal lines 230 to 235 of the odd rows in FIG. 12.

The row selection circuits 530 to 533 supply control signals to the pixel array 110 via junction contacts between the pixel substrate 1 and the circuit substrate 2, and drives the pixels 10 for each row. The AD conversion circuits 50A and 50B are arranged between the row selection circuits 530 and 531, and the AD conversion circuits 50C and 50D are arranged between the row selection circuits 532 and 533.

The AD conversion circuits 50A to 50D include reference signal generation circuits, comparators, counters, and memories, and convert the pixel signals from the pixels 10 into digital signals. The logic circuits 51A to 51D can perform digital signal processing such as digital gain, digital correlation double sampling, digital offset, and linearity correction in the digital signals from the AD conversion circuits 50A to 50D. The output circuits 52A to 52D output the digital signals processed by the logic circuits 51A to 51D to the outside of the imaging device.

The signal processing circuits 50 and 51 are connected to each other by wiring groups 540 and 541. That is, the AD conversion circuit 50A and the AD conversion circuit 50C are connected to each other by the wiring group 540, and the AD conversion circuit 50B and the AD conversion circuit 50D are connected to each other by the wiring group 541. The wiring groups 540 and 541 may include control lines BS, CBS, SHBS, CRES, RAMP, and the like, as will be described later.

Figure 17:
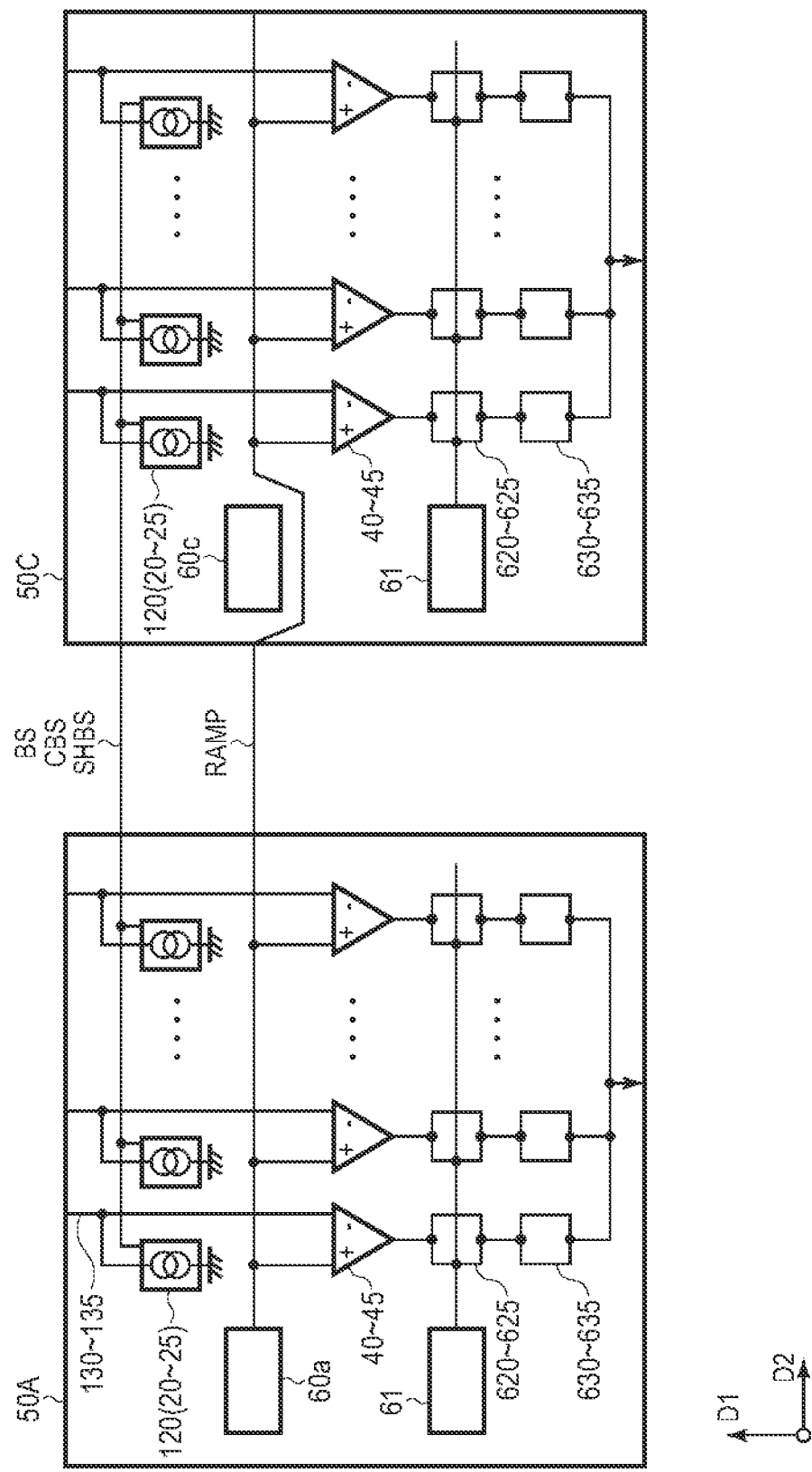
FIG. 17 is a diagram for explaining a configuration of an AD conversion circuit according to the ninth embodiment of the present invention.

FIG. 17 is a diagram for explaining the configuration of the AD conversion circuit in the present embodiment, and shows the AD conversion circuit 50A (first circuit region) and the AD conversion circuit 50C (second circuit region) in FIG. 16. The AD conversion circuits 50A and 50C respectively include load circuit groups 120, comparators 40 to 45, a reference signal generation circuit 60, a counter 61, first memories 620 to 625, and second memories 630 to 635. The load circuit groups 120, the comparators 40 to 45, the reference signal generation circuit 60, the counter 61, the first memories 620 to 625, and the second memories 630 to 635 are provided for each column to constitute a column circuit.

The plurality of load circuit groups 120 are arranged side by side in the row direction D2. The load circuit group 120 includes a plurality of current load circuits 20 to 25, and the current load circuits 20 to 25 are respectively connected to the column signal lines 130 to 135 (see FIG. 12). Here, the column signal lines 130 to 135 are collectively shown as one line. Each load circuit group 120 of the AD conversion circuits 50A and 50C is connected by the control lines CBS1 to CBS3. As a common bias voltage is supplied to the plurality of load circuit groups 120, a characteristic difference between the AD conversion circuits 50 A, 50 C can be reduced.

The inverting input nodes of the comparators 40 to 45 are connected to the column signal lines 130 to 135, and the non-inverting input nodes of the comparators 40 to 45 are connected to the control line RAMP. The control line RAMP may be provided separately for each of the comparators 40 to 45. Each of the comparators 40 to 45 compares the reference signal of the control line RAMP with the pixel signal of the column signal lines 130 to 135, and outputs a comparison signal representing the comparison result from the output node. Similarly to FIG. 11, the comparators 40 to 45 may also include one or more switches between a plurality of control lines CRES for reset switches, and one or more switches between the plurality of control lines CBS for bias voltages. In addition, the comparators 40 to 45 may include one or more switches 156 provided between the plurality of control lines RAMP of the reference signal. The control lines RAMP, CRES, and CBS may be disposed across the AD conversion circuits 50A and 50C.

The first reference signal generation circuit 60a outputs to the control line RAMP a reference signal whose voltage varies depending on the time. The control line RAMP is arranged from the AD conversion circuits 50A to 50C, and the first reference signal generation circuit 60a is shared by the AD conversion circuits 50A and 50C. Also in the AD conversion circuit 50C, the second reference signal generation circuit 60c can be provided. However, the reference signal generation circuit 60c is not connected to the control line RAMP and is in a non-operating state. As the AD conversion circuits 50A and 50B share the common reference signal generation circuit 60a, the difference in characteristics between the AD conversion circuits 50A and 50C can be reduced.

The counter 61 counts up or counts down the counter in synchronization with the reference signal. The counter 61 starts counting of clock pulses simultaneously with the start of the voltage change of the reference signal of the reference signal generation circuit 60a, and outputs a count signal. The count signal is supplied to the first memories 620 to 625. A counter may be provided for each column of the column signal lines 130 to 135, and a common clock pulse may be supplied to each counter.

The first memories 620 to 625 receive the comparison result from the comparators 40 to 45 and the count value from the counter 61, and latches the count value at the timing when the comparison result is inverted. The count value held in the first memories 620 to 625 represents a value obtained by analog-to-digital conversion of the pixel signal. The second memories 630 to 635 can further hold the count value transferred from the first memories 620 to 625. The first memories 620 to 625 and the second memories 630 to 635 can hold a count value at the time of resetting the pixel 10 and a count value based on photoelectric conversion of the pixel 10, respectively. The count values of the first memories 620 to 625 and the second memories 630 to 635 are output to the logic circuits 51A to 51D in FIG. 16.

Although not shown in FIG. 17, the AD conversion circuits 50B and 50D may be configured similarly to the AD conversion circuits 50A and 50C.

Figure 18:
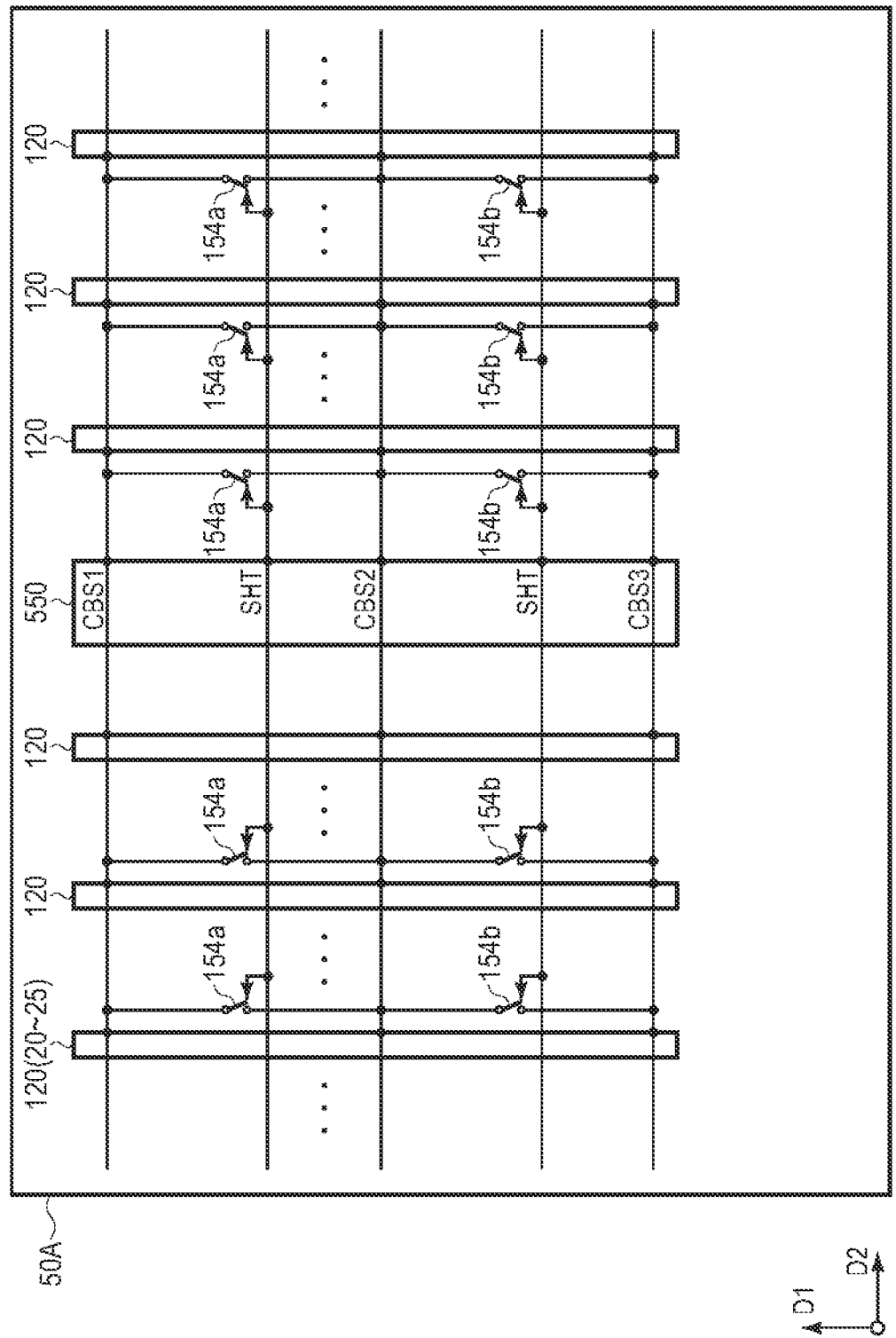
FIG. 18 is a diagram for explaining the configuration of the AD conversion circuit according to the ninth embodiment of the present invention.

FIG. 18 is a diagram for explaining the configuration of the AD conversion circuit in the present embodiment, and shows an example of the arrangement of the switches 154a and 154b.

As described above, in the AD conversion circuit 50A, a plurality of load circuit groups 120 are arranged side by side in a predetermined direction, for example, in the row direction D2. Each of the load circuit groups 120 includes a plurality of current load circuits 20 to 25 and is connected to each other by control lines CBS1 to CBS3, SHT, etc. A bias circuit 550 is arranged between the plurality of the load circuit groups 120. For example, the bias circuit 550 may be disposed substantially at the center of the row direction D2 in the plurality of load circuit groups 120. The bias circuit 550 supplies a predetermined bias voltage to each of the control lines CBS1 to CBS3 and SHT.

The switch 154a is provided between the control lines CBS1 and CBS2, and the switch 154b is provided between the control lines CBS2 and CBS3. The control signal SHT is applied to the control nodes of the switches 154a and 154b. In the present embodiment, the switches 154a and 154b can be arranged in a distributed manner among the load circuit groups 120. The number of the switches 154a and 154b may be smaller than the number of the load circuit groups 120.

The switches 154a and 154b may be arranged for each predetermined number of load circuit groups 120, and as an example, five sets of switches 154a and 154b may be arranged in 3,000 load circuit groups 120 at substantially equal intervals in the row direction D2. With such a configuration, while suppressing the number and chip area of the switches 154a and 154b, the voltages of the control lines CBS1, CBS2, and CBS3 can be uniform at all positions of the plurality of load circuit groups 120, and the difference between the columns can be reduced.

Further, as the bias circuit 550 is disposed between the plurality of load circuit groups 120, an influence of the parasitic resistance of the wiring group 540 between the AD conversion circuits 50A and 50C and the wiring group 541 between the AD conversion circuits 50B and 50D can be reduced. If the bias circuit 550 is arranged at the left end of the AD conversion circuit 50A, the wiring distance from the bias circuit 550 to the current load circuit group at the right end becomes longer, and the parasitic resistance may increase. In this case, the bias voltages supplied to the load circuit groups 120 at the left end and the right end are different from each other, and the image quality may be deteriorated. According to the present embodiment, it is possible to reduce the influence of the parasitic resistance of the wiring groups 540 and 541 by arranging the bias circuit 550 between the plurality of load circuit groups 120.

Although not shown in FIG. 18, in the AD conversion circuit 50C, the bias circuit 550 can be arranged between the plurality of load circuit groups 120. The bias circuits 550 arranged in the AD conversion circuits 50A and 50C can be connected to each other by the wiring group 540. This makes it possible to suppress the characteristic difference between the AD conversion circuits 50A and 50C while reducing the influence of the parasitic resistance of the wiring group 540 in the AD conversion circuit 50C. Although the load circuit group 120 has been described as an example in FIG. 18, a similar configuration may be adopted in a comparator group including a plurality of comparators 40 to 45. For example, the bias circuit of the comparators 40 to 45 and the reference signal generation circuit 60 may be arranged between a plurality of comparator groups. Further, the bias circuit 550 arranged in the AD conversion circuit 50A is not limited to one, but may be plural.

Tenth Embodiment

Figure 19:
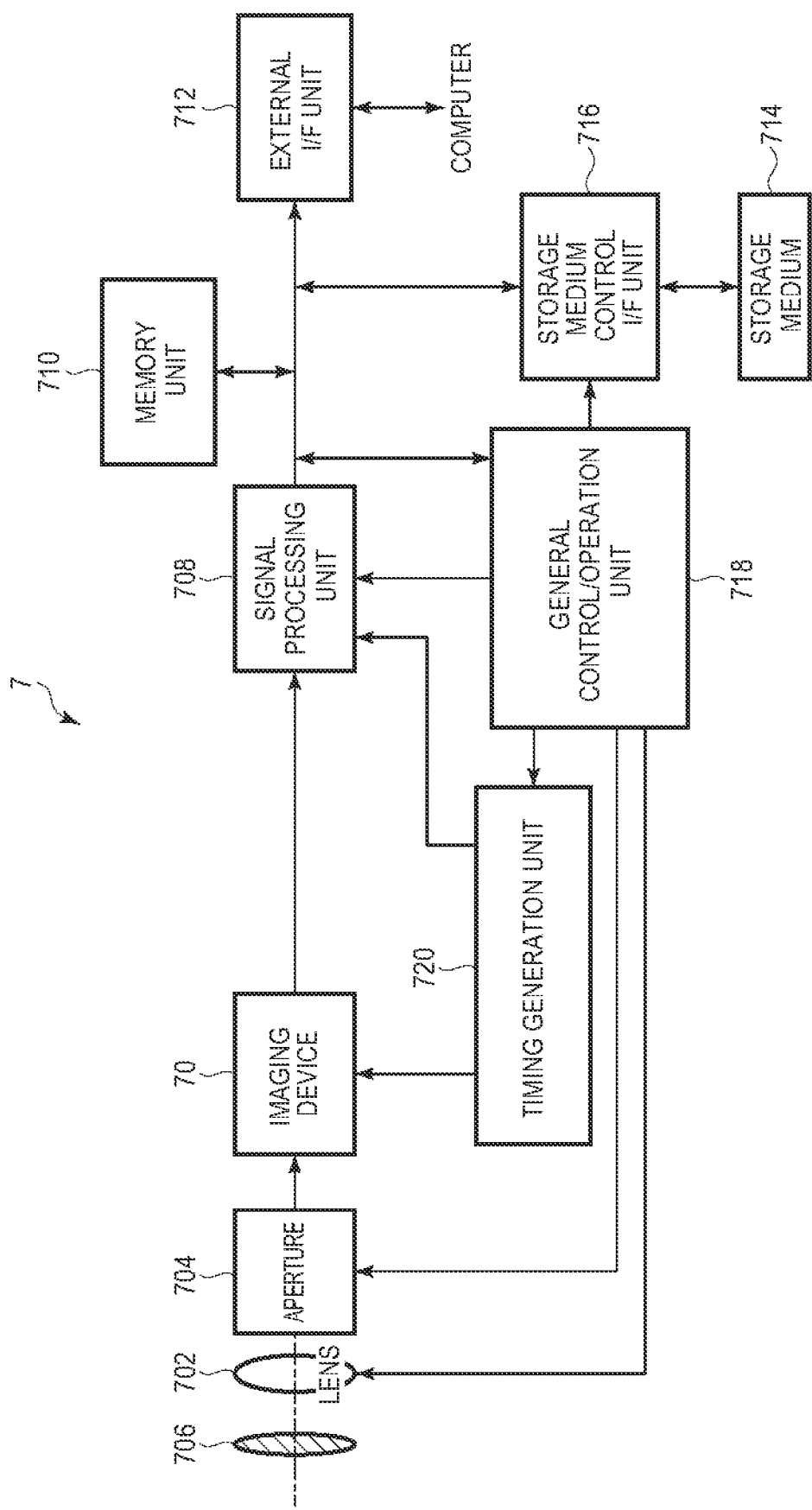
FIG. 19 is a block diagram showing a configuration of an equipment according to a tenth embodiment of the present invention.

An equipment according to the tenth embodiment of the present disclosure will be described with reference to FIG. 19. FIG. 19 is a block diagram illustrating a schematic configuration of the equipment according to the present embodiment.

The imaging device in the above-described embodiment can be applied to various equipment. Examples of equipment may include digital still cameras, digital camcorders, headcams, copiers, fax machines, mobile phones, in-vehicle cameras, observation satellites, surveillance cameras or the like. FIG. 19 illustrates a block diagram of a digital still camera as example of the equipment.

The equipment 7 illustrated in FIG. 19 includes a barrier 706, a lens 702, an aperture 704, an imaging device 70, a signal processing unit 708, a timing generation unit 720, a general control/operation unit 718, a memory unit 710, storage medium control I/F unit 716, a storage medium 714, and an external I/F unit 712. At least one of the barrier 706, the lens 702 and the aperture 704 is an optical device corresponding to the device. The barrier 706 protects the lens 702 and the lens 702 captures an optical image of an object onto the imaging device 70. The aperture 704 changes a light amount passing through the lens 702. The imaging device 70 is configured as in the above-described embodiment, and converts the optical image captured by the lens 702 into image data (image signal). Assume that the semiconductor substrate of the imaging device 70 is provided with an AD (Analog to Digital) conversion unit. A signal processing unit 708 compresses various corrections and data to the imaging data outputted from the imaging device 70.

The timing generation unit 720 outputs various timing signals to the imaging device 70 and the signal processing unit 708. The general control/operation unit 718 controls the entire digital still camera, and the memory unit 710 temporarily stores image data. The storage medium control I/F unit 716 is an interface for recording or reading image data on or from the storage medium 714, and the storage medium 714 is a removable storage medium such as a semiconductor memory for recording or reading image data. The external I/F unit 712 is an interface for communicating with an external computer or the like. The timing signal or the like may be input from the outside of the equipment. Further, the equipment 7 may be provided with a display device (monitor, electronic viewfinder, etc.) for displaying information obtained by the photoelectric conversion device. The equipment includes at least a photoelectric conversion device. Further, the equipment may include at least one of an optical device, a control device, a processing device, a display device, a storage device, and a machinery and equipment operating based on information obtained by the photoelectric conversion device. The machinery and equipment may be a movable portion (for example, a robotic arm) that operates in response to a signal from the photoelectric conversion device.

In the present embodiment, the imaging device 70 and the AD conversion unit are provided on different semiconductor substrates, but the imaging device 70 and the AD conversion unit may be formed on the same semiconductor substrate. The imaging device 70 and the signal processing unit 708 may be formed on the same semiconductor substrate.

Further, each pixel may also include a plurality of photoelectric conversion elements. The signal processing unit 708 may be configured to process the pixel signal based on the electric charge generated in the first photoelectric conversion element and the pixel signal based on the electric charge generated in the second photoelectric conversion element, and acquire distance information from the imaging device 70 to the object.

Eleventh Embodiment

Figure 20A:
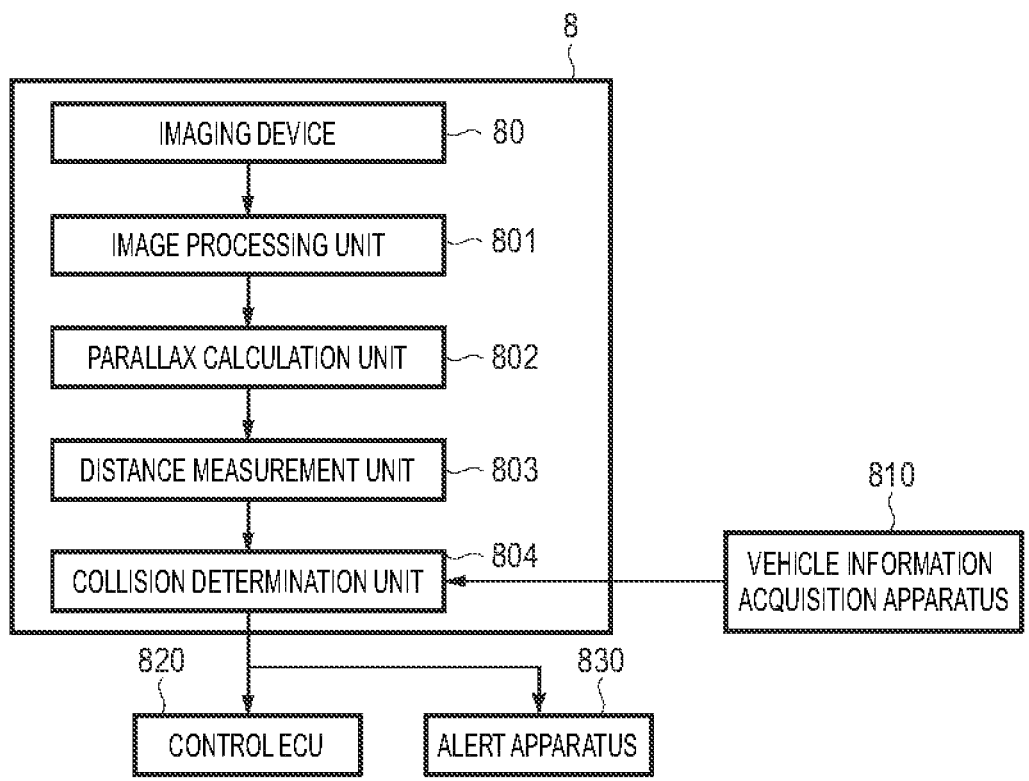
FIG. 20A and FIG. 20B are block diagrams of an equipment related to an on-vehicle camera according to an eleventh embodiment of the present invention.
Figure 20B:
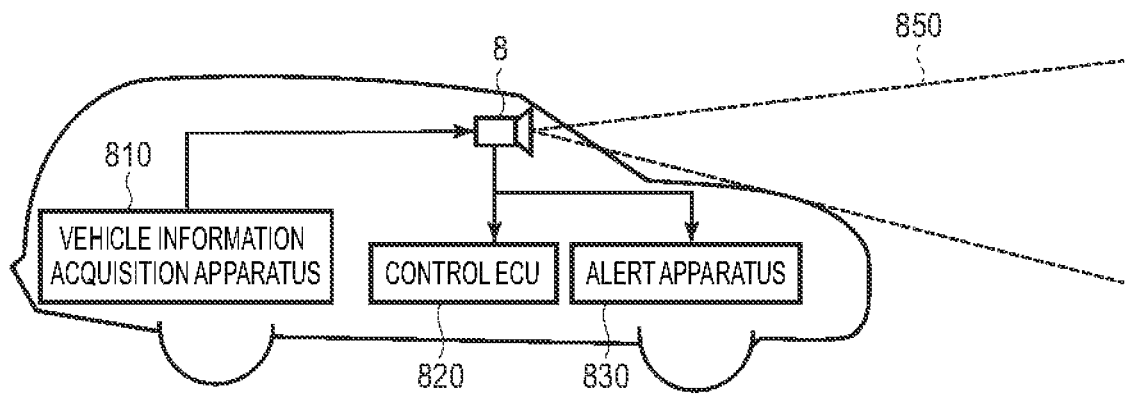

FIG. 20A and FIG. 20B are block diagrams of an equipment related to an on-vehicle camera according to the present embodiment. An equipment 8 has an imaging device 80 in the above-described embodiments. The equipment 8 has an image processing unit 801 that performs image processing on a plurality of image data acquired by the imaging device 80 and a parallax calculation unit 802 that calculates a parallax (a phase difference of parallax images) from the plurality of image data acquired by the equipment 8. Further, the equipment 8 has a distance measurement unit 803 that calculates a distance to the object based on the calculated parallax and a collision determination unit 804 that determines whether or not there is a collision possibility based on the calculated distance. Herein, each of the parallax calculation unit 802 and the distance measurement unit 803 is an example of a distance information acquisition unit that acquires distance information on the distance to the object. That is, the distance information is information on a parallax, a defocus amount, a distance to an object, or the like. The collision determination unit 804 may use any of the distance information to determine the collision possibility. The distance information acquisition unit may be implemented by dedicatedly designed hardware or may be implemented by a software module. Further, the distance information acquisition unit may be implemented by a field programmable gate array (FPGA), an application specific integrated circuit (ASIC), or the like or may be implemented by a combination thereof.

The equipment 8 is connected to a vehicle information acquisition device 810 and can acquire vehicle information such as a vehicle speed, a yaw rate, a steering angle, or the like. Further, the equipment 8 is connected to a control ECU 820, which is a control device that outputs a control signal for causing a vehicle to generate braking force based on a determination result by the collision determination unit 804. Further, the equipment 8 is also connected to an alert device 830 that issues an alert to the driver based on a determination result by the collision determination unit 804. For example, when the collision probability is high as the determination result of the collision determination unit 804, the control ECU 820 performs vehicle control to avoid a collision or reduce damage by applying a brake, pushing back an accelerator, suppressing engine power, or the like. The alert device 830 alerts a user by sounding an alert such as a sound, displaying alert information on a display of a car navigation system or the like, providing vibration to a seat belt or a steering wheel, or the like. The equipment 8 functions as a control means for controlling the operation of controlling the vehicle as described above.

In the present embodiment, an area around a vehicle, for example, a front area or a rear area is captured by using the equipment 8. FIG. 20B illustrates the configuration of the imaging system when a front area of a vehicle (a capturing area 850) is captured. The vehicle information acquisition device 810 as the imaging control means transmits an instruction to the equipment 8 or the imaging device 80 so as to perform the operations described in the above-described first to ninth embodiments. With this configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a moving body (moving equipment) such as a ship, an airplane, an artificial satellite, an industrial robot and a consumer robot, for example. In addition, the imaging system can be widely applied to a device which utilizes object recognition or biosensing such as an intelligent transportation system (ITS) or monitor system, without being limited to moving bodies.

Modified Embodiment

The present disclosure is not limited to the above embodiment, and various modifications can be made. For example, an example in which a part of the configuration of any one of the embodiments is added to another embodiment, or an example in which a part of the configuration of another embodiment is replaced is also an embodiment of the present disclosure.

For example, in the above-described embodiment, the pixel array 110 and the column circuit 114 may be formed on different semiconductor substrates. Further, the control line which is made conductive or non-conductive by the switch is not limited to the example of the above-described embodiment.

It should be noted that the above embodiments are merely examples of embodiments of the present invention, and the technical scope of the present invention should not be interpreted in a limited manner. That is, the present invention may be practiced in a variety of ways without departing from the spirit of the art or its essential features.

Embodiments of the present invention can also be realized by a computer of a system or equipment that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or equipment by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to provide an imaging device, an imaging system, and a control method of the imaging device, which can stably add time information to image data when photographing a moving image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-126454, filed Jul. 27, 2020 and Japanese Patent Application No. 2021-062786, filed Apr. 1, 2021, which are hereby incorporated by reference herein in their entirety.

What is claimed is:

1. An imaging device comprising:
a pixel array that includes a plurality of pixels arranged in a matrix and outputs pixel signals in accordance with incident light;
a first column signal line and a second column signal line that are respectively provided corresponding to columns of the pixel array;
a first column circuit that is connected to the first column signal line, and reads out signals from pixels of the plurality of pixels, connected to the first column signal line;
a second column circuit that is connected to the second column signal line, and reads out signals from pixels of the plurality of pixels, connected to the second column signal line;
a first control line that controls the first column circuit;
a second control line that controls the second column circuit; and
a plurality of switches that are provided between the first control line and the second control line, and are controlled by a common signal, to change from one of a plurality of operating modes to another one of the plurality of operating modes of the first column circuit and the second column circuit.

2. The imaging device according to claim 1, wherein the pixels connected to the first column signal line and the pixels connected to the second column signal line are arranged in two columns different from each other in the pixel array.

3. The imaging device according to claim 1, wherein the pixels connected to the first column signal line and the pixels connected to the second column signal line are arranged in a common column in the pixel array.

4. The imaging device according to claim 1, wherein the plurality of switches are turned off, when a signal is read from either the first column signal line or the second column signal line.

5. The imaging device according to claim 1, wherein the plurality of switches are turned on, when a signal is read from the first column signal line and the second column signal line.

6. The imaging device according to claim 3, wherein the plurality of switches are turned on, when a plurality of rows of signals are simultaneously read from the first column signal line and the second column signal line.

7. The imaging device according to claim 1,
wherein the first column circuit includes a first current load circuit connected to the first column signal line, and
wherein the second column circuit includes a second current load circuit connected to the second column signal line.

8. The imaging device according to claim 7,
wherein the first control line is connected to a gate node of a first current source transistor of the first current load circuit, and
wherein the second control line is connected to a gate node of a second current source transistor included in the second current load circuit.

9. The imaging device according to claim 7,
wherein the first current load circuit includes a first cascode transistor provided between the first current source transistor and the first column signal line, and the first control line is connected to a gate node of the first current source transistor, and
wherein the second current load circuit includes a second cascode transistor provided between the second current source transistor and the second column signal line, and the second control line is connected to a gate node of the second current source transistor.

10. The imaging device according to claim 8,
wherein the first column circuit includes a first sampling and holding switch provided between the gate node of the first current source transistor and a bias line, and
wherein the second column circuit includes a second sampling and holding switch provided between the gate node of the second current source transistor and the bias line.

11. The imaging device according to claim 10,
wherein the first control line is connected to a gate node of the first sampling and holding switch, and
wherein the second control line is connected to a gate node of the second sampling and holding switch.

12. The imaging device according to claim 7,
wherein the first column circuit includes a first comparator that compares a signal of the first column signal line with a first reference signal that changes in accordance with time, and
wherein the second column circuit includes a second comparator that compares a signal of the second column signal line with a second reference signal that changes in accordance with time.

13. The imaging device according to claim 12, wherein the first current load circuit and the second current load circuit are arranged adjacent to each other, and the first comparator and the second comparator are arranged adjacent to each other.

14. The imaging device according to claim 13, wherein the first current load circuit, the second current load circuit, the first comparator, and the second comparator are arranged in order in the column direction.

15. The imaging device according to claim 14, wherein the first control line is supplied with the first reference signal, and the second control line is supplied with the second reference signal.

16. The imaging device according to claim 12,
wherein the first control line is connected to a gate node of a first reset switch for resetting an input node of the first comparator,
wherein the second control line is connected to a gate node of a second reset switch for resetting an input node of the second comparator.

17. The imaging device according to claim 12,
wherein the first control line supplies a first bias voltage to the first comparator, and the second control line supplies a second bias voltage to the second comparator.

18. The imaging device according to claim 1, further comprising:
a third column signal line and a fourth column signal line that are respectively provided corresponding to the columns of the pixel array;
a third column circuit that is connected to the third column signal line;
a fourth column circuit that is connected to the fourth column signal line;
a third control line that controls the third column circuit; and
a fourth control line that controls the fourth column circuit,
wherein the third control line is connected to the first control line, and the fourth control line is connected to the second control line.

19. The imaging device according to claim 18, wherein a set of the first column signal line, the second column signal line, the third column signal line and the fourth column signal line is provided in each of odd and even rows of the pixel array.

20. The imaging device according to claim 15, further comprising:
a first circuit region including a plurality of the first column circuits and a plurality of the second column circuits; and
a second circuit region including a plurality of the first column circuits and a plurality of the second column circuits,
wherein the first control line to which the first reference signal is supplied and the second control line to which the second reference signal is supplied are arranged from the first circuit region to the second circuit region,
wherein the first circuit region includes a first reference signal generation circuit that is connected to the first control line and the second control line, and
wherein the second circuit region includes a second reference signal generation circuit that is not connected to the first control line and the second control line.

21. The imaging device according to claim 20, wherein a row selection circuit that selects a row of the pixel array is arranged between the first circuit region and the second circuit region.

22. The imaging device according to claim 1, further comprising:
a plurality of circuit groups each including the first column circuit and the second column circuit and arranged in a predetermined direction; and
a bias circuit that supplies a predetermined voltage to each of the first control line and the second control line,
wherein the bias circuit is arranged between the plurality of circuit groups.

23. The imaging device according to claim 22, wherein the bias circuit is arranged substantially in the center of the predetermined direction in the plurality of circuit groups.

24. The imaging device according to claim 22, wherein the number of switches is two or more and is smaller than the number of circuit groups.

25. An equipment including the imaging device according to claim 1, further comprising at least one of:
a control device that controls the imaging device;
a processing device that processes a signal output from the imaging device;
a display device that displays information obtained by the imaging device;
a storage device that stores the information obtained by the imaging device; and
a machinery equipment that operates on the basis of the information obtained by the imaging device.

26. The equipment according to claim 25,
wherein the pixel includes a plurality of photoelectric conversion portions,
wherein the processing unit processes image signals generated in the plurality of photoelectric conversion portions respectively and acquires distance information from the imaging device to an object.

27. The imaging device according to claim 1, wherein the plurality of operating modes includes a first mode in which the first control line and the second control line are conducted by turning the switch on, and a second mode in which the first control line and the second control line are not conducted by turning the switch off.

28. The imaging device of claim 27, wherein in the first operating mode, a potential difference between the first control line and the second control line is smaller than in the second operating mode.

29. The imaging device of claim 27, wherein
the first column circuit includes a first sampling and holding switch provided between a gate node of a first current source transistor and a bias line,
the second column circuit includes a second sampling and holding switch provided between a gate node of a second current source transistor and the bias line,
the first operating mode controls the first sampling and holding switch and the second sampling and holding switch at a same timing, and
the second mode of operation is to control the first sampling and holding switch and the second sampling and holding switch independently of each other.

30. The imaging device of claim 27, wherein
the first column circuit includes a first comparator that compares a signal of the first column signal line with a first reference signal that changes in accordance with time,
the second column circuit includes a second comparator that compares a signal of the second column signal line with a second reference signal that changes in accordance with time, and
in the first operating mode, a difference in bias voltage between a current source transistor of the first comparator and a current source transistor of the second comparator is smaller than in the second operating mode.

31. An imaging device comprising:
a pixel array that includes a plurality of pixels arranged in a matrix and outputs pixel signals in accordance with incident light;

a first column signal line and a second column signal line that are respectively provided corresponding to columns of the pixel array;

a first column circuit that is connected to the first column signal line;

a second column circuit that is connected to the second column signal line;

a first control line that controls the first column circuit;

a second control line that controls the second column circuit; and a plurality of switches that are provided between the first control line and the second control line, and are controlled by a common signal, wherein, the first column circuit includes a first current load circuit connected to the first column signal line, the second column circuit includes a second current load circuit connected to the second column signal line, the first control line is connected to a gate node of a first current source transistor of the first current load circuit, and the second control line is connected to a gate node of a second current source transistor included in the second current load circuit.

32. An imaging device comprising:

a pixel array that includes a plurality of pixels arranged in a matrix and outputs pixel signals in accordance with incident light;

a first column signal line and a second column signal line that are respectively provided corresponding to columns of the pixel array;

a first column circuit that is connected to the first column signal line;

a second column circuit that is connected to the second column signal line;

a first control line that controls the first column circuit;

a second control line that controls the second column circuit; and a plurality of switches that are provided between the first control line and the second control line, and are controlled by a common signal, wherein, the first column circuit includes a first current load circuit connected to the first column signal line, the second column circuit includes a second current load circuit connected to the second column signal line, the first current load circuit includes a first cascode transistor provided between the first current source transistor and the first column signal line, and the first control line is connected to a gate node of the first current source transistor, and the second current load circuit includes a second cascode transistor provided between the second current source transistor and the second column signal line, and the second control line is connected to a gate node of the second current source transistor.

33. An equipment including the imaging device according to claim 31, and further comprising at least one of:

a control device that controls the imaging device;

a processing device that processes a signal output from the imaging device;

a display device that displays information obtained by the imaging device;

a storage device that stores the information obtained by the imaging device; and a machinery equipment that operates on the basis of the information obtained by the imaging device.

34. The equipment according to claim 33, wherein the pixel includes a plurality of photoelectric conversion portions, and wherein the processing unit processes image signals generated in the plurality of photoelectric conversion portions respectively and acquires distance information from the imaging device to an object.

35. An equipment including the imaging device according to claim 32, and further comprising at least one of:

a control device that controls the imaging device;

a processing device that processes a signal output from the imaging device;

a display device that displays information obtained by the imaging device;

a storage device that stores the information obtained by the imaging device; and a machinery equipment that operates on the basis of the information obtained by the imaging device.

36. The equipment according to claim 35, wherein the pixel includes a plurality of photoelectric conversion portions, and wherein the processing unit processes image signals generated in the plurality of photoelectric conversion portions respectively and acquires distance information from the imaging device to an object.

* * * * *